(12) United States Patent
Wiplinger

(10) Patent No.: US 12,358,621 B2
(45) Date of Patent: Jul. 15, 2025

(54) FLOAT PLANE TECHNOLOGY

(71) Applicant: Wipaire, Inc., South St. Paul, MN (US)

(72) Inventor: Robert D. Wiplinger, Inver Grove Heights, MN (US)

(73) Assignee: Wipaire, Inc., South St. Paul, MN (US)

( * ) Notice: Subject to any disclaimer, the term of this patent is extended or adjusted under 35 U.S.C. 154(b) by 0 days.

(21) Appl. No.: 18/333,381

(22) Filed: Jun. 12, 2023

(65) Prior Publication Data

US 2024/0132213 A1 Apr. 25, 2024
US 2024/0228038 A9 Jul. 11, 2024

Related U.S. Application Data

(60) Provisional application No. 63/351,557, filed on Jun. 13, 2022.

(51) Int. Cl.
*B64D 1/16* (2006.01)
*B64C 25/54* (2006.01)
*B64C 35/00* (2006.01)

(52) U.S. Cl.
CPC ............... *B64D 1/16* (2013.01); *B64C 25/54* (2013.01); *B64C 35/00* (2013.01)

(58) Field of Classification Search
CPC .......... B64D 1/16; B64D 37/16; B64C 35/00; B64C 25/54
See application file for complete search history.

(56) References Cited

U.S. PATENT DOCUMENTS

| 1,373,408 A | 4/1921 | Starling |
| 1,603,304 A | 10/1926 | Zimmermann |
| 1,722,467 A | 7/1929 | Huff |
| 1,765,328 A | 6/1930 | Fokker et al. |
| 1,765,329 A | 6/1930 | Fokker et al. |
| 1,790,988 A | 2/1931 | Lalli |
| 1,858,762 A | 5/1932 | Bellanca |
| 1,911,431 A * | 5/1933 | Cawley .................... B64D 1/16 244/136 |
| 1,995,089 A | 3/1935 | Bellanca |

(Continued)

FOREIGN PATENT DOCUMENTS

| CA | 1189496 A1 | 6/1985 |
| CA | 3134089 A1 | 10/2020 |

(Continued)

OTHER PUBLICATIONS

Adam A500, Wikipedia, Retrieved online from <https://web.archive.org/web/20161005081942/https://en.wikipedia.org/wiki/Adam_A500> on Mar. 18, 2018, dated Oct. 5, 2016, 4 pages.

(Continued)

*Primary Examiner* — Nicholas McFall
*Assistant Examiner* — Eric Acosta
(74) *Attorney, Agent, or Firm* — Fredrikson & Byron, P.A.

(57) ABSTRACT

The invention provides a float plane having a fuselage, a wing, and two floats mounted to the fuselage. In one group of embodiments, the float plane is a firefighting float plane that includes a water tank and a water scooping assembly. In another group of embodiments, the float plane includes a spreader bar suspension assembly. In certain embodiments, the float plane is a firefighting float plane that includes a water tank, a water scooping assembly, and a spreader bar suspension assembly.

16 Claims, 22 Drawing Sheets

(56) References Cited

U.S. PATENT DOCUMENTS

| | | |
|---|---|---|
| D115,854 S | 7/1939 | Loudy |
| 2,359,652 A | 10/1944 | Larsen |
| 2,379,355 A | 6/1945 | Hodgdon |
| 2,534,722 A | 12/1950 | Meiklejohn, Jr. |
| 2,665,092 A | 1/1954 | Sands |
| 2,699,299 A | 1/1955 | Herrick |
| 2,958,486 A | 11/1960 | Bloomfield et al. |
| D198,346 S | 6/1964 | Ahrens |
| 3,289,415 A | 12/1966 | Merrill |
| 3,423,053 A | 1/1969 | Hawkshaw |
| 3,661,211 A | 5/1972 | Powers |
| 3,754,601 A | 8/1973 | Linkewich |
| 3,897,829 A | 8/1975 | Eason |
| 3,901,467 A | 8/1975 | Hawkshaw |
| 4,090,567 A | 5/1978 | Tomlinson |
| 4,165,059 A | 8/1979 | Summer |
| 4,172,499 A | 10/1979 | Richardson et al. |
| 4,298,175 A | 11/1981 | Earl |
| D273,005 S | 3/1984 | Mccomas |
| 4,474,350 A | 10/1984 | Hawkshaw |
| 4,645,143 A | 2/1987 | Coffy |
| D303,950 S | 10/1989 | Burgess |
| 4,962,978 A | 10/1990 | Weston |
| D319,805 S | 9/1991 | Wiegert |
| 5,065,958 A | 11/1991 | Stubstad et al. |
| 5,224,669 A | 7/1993 | Guimbal |
| 5,320,306 A | 6/1994 | Gennaro |
| 5,462,242 A | 10/1995 | Collins et al. |
| 5,549,259 A | 8/1996 | Herlik |
| D381,952 S | 8/1997 | Carter, Jr. |
| 5,782,427 A | 7/1998 | Hermach |
| 5,967,462 A | 10/1999 | Foster et al. |
| 6,113,028 A | 9/2000 | Lohse et al. |
| 6,192,990 B1 | 2/2001 | Brooke |
| 6,209,593 B1 | 4/2001 | Nichols |
| 6,244,538 B1 | 6/2001 | Howard et al. |
| D446,182 S | 8/2001 | Adam et al. |
| 6,367,738 B1 | 4/2002 | Wadleigh |
| 6,405,980 B1 | 6/2002 | Carter |
| 6,427,942 B2 | 8/2002 | Howard et al. |
| 6,644,595 B2 | 11/2003 | Ramage et al. |
| 6,688,402 B1 | 2/2004 | Wise |
| 6,874,734 B2 | 4/2005 | Ramage et al. |
| 6,927,702 B2 | 8/2005 | Wiplinger |
| D543,248 S | 5/2007 | Winston |
| D559,329 S | 1/2008 | Connally et al. |
| 7,322,872 B2 | 1/2008 | Butler et al. |
| 7,552,895 B2 | 6/2009 | From |
| 7,690,600 B2 | 4/2010 | Olive et al. |
| D620,838 S | 8/2010 | Miralles et al. |
| 7,918,417 B2 | 4/2011 | Mouille |
| 8,763,997 B2 | 7/2014 | Dunn |
| 8,919,694 B2 | 12/2014 | Amante et al. |
| 8,979,024 B2 | 3/2015 | Piccone et al. |
| 8,998,134 B2 | 4/2015 | Fews et al. |
| 9,085,361 B2 | 7/2015 | Prud'Homme-Lacroix |
| D743,868 S | 11/2015 | Cummings et al. |
| 9,327,149 B2 | 5/2016 | Lemke et al. |
| 9,840,326 B2 | 12/2017 | Stupakis |
| 9,908,622 B2 | 3/2018 | Doten |
| 9,957,047 B2 * | 5/2018 | Benedik .................. B64D 1/22 |
| 10,146,186 B2 | 12/2018 | Yamamoto et al. |
| D843,919 S | 3/2019 | Tzarnotzky et al. |
| D856,898 S | 8/2019 | Evulet |
| D856,899 S | 8/2019 | Evulet et al. |
| D865,636 S | 11/2019 | Reichert et al. |
| D868,668 S | 12/2019 | Parvizian et al. |
| D872,681 S | 1/2020 | Tzarnotzky et al. |
| D873,200 S | 1/2020 | Langford, III et al. |
| D873,201 S | 1/2020 | Langford, III et al. |
| D875,022 S | 2/2020 | Cummings |
| D880,401 S | 4/2020 | Mombrinie |
| D881,788 S | 4/2020 | Tian |
| 11,123,587 B2 | 9/2021 | Schnarr et al. |
| 11,208,210 B2 | 12/2021 | Wiplinger |
| 2002/0084383 A1 | 7/2002 | Maeda |
| 2002/0125016 A1 | 9/2002 | Cofield |
| 2003/0146005 A1 | 8/2003 | Brooke et al. |
| 2006/0289697 A1 | 12/2006 | Clark |
| 2007/0164162 A1 | 7/2007 | Olive et al. |
| 2009/0126951 A1 | 5/2009 | Baek |
| 2010/0178176 A1 | 7/2010 | Kenyon et al. |
| 2011/0036939 A1 | 2/2011 | Easter |
| 2011/0192617 A1 | 8/2011 | Saurina Casals |
| 2011/0248118 A1 | 10/2011 | Meekins et al. |
| 2014/0158815 A1 | 6/2014 | Renteria |
| 2014/0158816 A1 | 6/2014 | Delorean |
| 2016/0279451 A1 | 9/2016 | Doten |
| 2017/0072236 A1 | 3/2017 | Cordani et al. |
| 2017/0080267 A1 * | 3/2017 | Wagner .................. A62C 5/002 |
| 2017/0267368 A1 * | 9/2017 | Hara ..................... B64C 1/1453 |
| 2018/0297705 A1 | 10/2018 | Coulson et al. |
| 2019/0168873 A1 | 6/2019 | Wiplinger |
| 2021/0171192 A1 | 6/2021 | Willford |
| 2021/0198934 A1 * | 7/2021 | Trotter ................. A62C 3/0235 |

FOREIGN PATENT DOCUMENTS

| | | |
|---|---|---|
| CN | 105771115 A | 7/2016 |
| EP | 3138772 A1 | 3/2017 |
| FR | 1481100 A | 5/1967 |
| GB | 2163710 A | 3/1986 |
| WO | 2010028538 A1 | 3/2010 |
| WO | 2016113256 A1 | 7/2016 |
| WO | 2018165699 A1 | 9/2018 |
| WO | 2020214081 A1 | 10/2020 |

OTHER PUBLICATIONS

Ampaire's Electric EEL Skymaster Makes Longest Flight Yet by Curt Epstein, dated Oct. 12, 2020, https://www.ainonline.com/aviation-news/business-aviation/2020-10-12/ampaires-electric-eel-skymaster-makes-longest-flight-yet.

Big Boys Toys UAE Arrow Gyrocopter YouTube reference by Big Boys Toys Global, dated Oct. 12, 2016, https://www.youtube.com/watch?v=7wikfnwvdY4.

Cessna 337 Portugal by WS-Clave, Retrieved online from <https://ws-clave.deviantart.com/art/Cessna-337-Portugal-450887310>, originally submitted on Apr. 29, 2014, 2 pages.

Cessna 337 Skymaster Compilation YouTube. by TheHDAviation. dated Jun. 19, 2017. found on line [Dec. 18, 2020] https://www.youtube.com/watch?v=8WoHxl9z6-Y.

Cessna O-2 Skymaster flying display at Sanicole Airshow 2015 by MUC-Spotter. dated Mar. 29, 2016, https://www.youtube.com/watch?v=vOiazjlb-3c.

Cessna Skymaster, Wikipedia, Retrieved online from <https://web.archive.org/web/20161129212525/https://en.wikipedia.org/wiki/Cessna_Skymaster> on Mar. 18, 2018, dated Nov. 29, 2016, 6 pages.

Dornier Seastar, Wikipedia, Retrieved online from <https://web.archive.org/web/20161017180310/https://en.wikipedia.org/wiki/Dornier_Seastar> on Mar. 18, 2018, dated Oct. 17, 2016, 3 pages.

Fire Boss LLC, About USs, Retrieved online from <https://web.archive.org/web/20161101162619/http://www.firebossllc.com:80/about.php> on Mar. 18, 2018, dated Nov. 1, 2016, 2 pages.

Fire Boss LLC, Gallery, Retrieved online from <https://web.archive.org/web/20161101162717/http://firebossllc.com/gallery.php> on Mar. 18, 2018, dated Nov. 1, 2016, 1 page.

Fire Boss LLC, Homepage, Retrieved online from <https://web.archive.org/web/20161202224642/http://www.firebossllc.com> on Mar. 18, 2018, dated Dec. 2, 2016, 1 page.

Fire Boss LLC, Index, Retrieved online from <https://web.archive.org/web/20161101162726/http://firebossllc.com/index.php> on Mar. 18, 2018, dated Nov. 1, 2016, 1 page.

Fire Boss LLC, Specifications, Retrieved online from <https://web.archive.org/web/20161101163115/http://firebossllc.com/specs.php> on Mar. 18, 2018, dated Nov. 1, 2016, 3 pages.

Howarth, "End of the line for CL-415 water-bombers?", Aviation Week Network, Retrieved online from <http://aviationweek.com/blog/end-line-cl-415-water-bombers>, Jun. 12, 2013, 2 pages.

(56) References Cited

OTHER PUBLICATIONS

United States Patent Office, "Office Action" From U.S. Appl. No. 17/729,136, Dated Apr. 3, 2024, pp. 63.

Personal Airline Exchange Orders 50 Ampaire EEL Hybrid Electric Commuter Airplanes. by Nicolas Zart. dated Jun. 22, 2019. Found online [Dec. 18, 2020] https://cleantechnica.com/2019/06/22/personal-airline-exchange-orders-50-ampaire-eel-hybrid-electric-commuter-airplanes/.

International Searhcing Authority, "International Preliminary Report on Patentability and Written Opinion" , From Application No. PCT/US2023/025078, Dated Dec. 10, 2024, pp. 13.

* cited by examiner

FLOAT PLANE TECHNOLOGY

CROSS REFERENCE

This application claims the benefit of U.S. Provisional Patent Application No. 63/351,557, filed Jun. 13, 2022, the entire contents of which are incorporated herein by reference.

FIELD OF THE INVENTION

The present invention relates to a float plane. More specifically, the invention provides a float plane having a fuselage, a wing, and two floats.

BACKGROUND OF THE INVENTION

A float plane is a seaplane provided with a pair of pontoons, known as floats. The floats are connected to the fuselage of the plane. The floats are configured to provide buoyancy on water, such that the float plane can takeoff from, and land on, the surface of a lake, river, ocean, or other body of water.

As set forth in the present disclosure, it would be desirable to provide a float plane having a scooping assembly that can be used to fill a water tank on the aircraft. Additionally or alternatively, it would be desirable to provide a float plane having a spreader bar suspension assembly between the floats.

SUMMARY OF THE INVENTION

Certain embodiments of the invention provide a firefighting float plane that includes a fuselage, a wing, a water tank, first and second floats, and a scoop assembly. In the present embodiments, the scoop assembly is configured to produce a pitch-down moment on the firefighting float plane during a filling operation. Preferably, the pitch-down moment is less than 10,000 foot pounds.

In some embodiments, the invention provides a firefighting float plane that includes a fuselage, a wing, a water tank, first and second floats, and a scoop assembly. The scoop assembly includes an elongated scoop tube and has a pivot point about which the elongated scoop tube is pivotable between a stowed position and a deployed position. The pivot point is further aft than the wing.

Some embodiments of the invention provide a firefighting float plane that includes a fuselage, a wing, a water tank, first and second floats, and a scoop assembly. The scoop assembly includes an elongated scoop tube that has a stowed configuration and a deployed configuration. In the present embodiments, the elongated scoop tube, when in the stowed configuration, is carried along an underside of the fuselage. By comparison, when the elongated scoop tube is in the deployed configuration, it projects downwardly away from the fuselage and between the first and second floats. In the present embodiments, the elongated scoop tube has a length that terminates at a water scooping apparatus. The water scooping apparatus includes a hook portion. In the present embodiments, the water scooping apparatus is located outside of the fuselage, and thus is exposed to airflow outside the fuselage when the elongated scoop tube is in the stowed configuration. Preferably, the water scooping apparatus is configured to offset an amount of yaw instability otherwise created by the first and second floats. Thus, the preferred water scooping apparatus includes a leading aerodynamic wall portion, a tube portion, and a trailing aerodynamic wall portion. In these embodiments, the tube portion is located between the leading and trailing aerodynamic wall portions, and is configured to receive therethrough a flow of water retrieved during a filling operation.

In certain embodiments, the invention provides a firefighting float plane that includes a fuselage, a wing, a water tank, first and second floats, and a scoop assembly. The firefighting float plane also includes a front float-attach framework and a rear float-attach framework. The front and rear float-attach frameworks connect the first and second floats to the fuselage. In the present embodiments, the scoop assembly is mounted to the rear float-attach framework.

Some embodiments of the invention provide a firefighting float plane that includes a fuselage, a wing, a water tank, first and second floats, and a scoop assembly. The firefighting float plane also includes a mounting structure connecting the first and second floats to the fuselage. In the present embodiments, the scoop assembly is attached to the mounting structure at an attachment location that is spaced below the fuselage.

In some embodiments, the invention provides a float plane that includes a fuselage, a wing, first and second floats, and a spreader bar suspension assembly. The spreader bar suspension assembly includes a first spreader bar bridge extending crosswise between, so as to be connected to both, the first and second floats. The first spreader bar bridge includes a first shock absorber.

Certain embodiments of the invention provide a firefighting float plane that includes a fuselage, a wing, a water tank, first and second floats, and a scoop assembly. In the present embodiments, the water tank includes a fore compartment and an aft compartment. The scoop assembly includes a scoop tube, at least part of which is external to the fuselage. The scoop tube is part of a flow line that enters the fuselage and branches into first and second flow lines. The first flow line extends into the aft compartment and has a discharge outlet located in the aft compartment, whereas the second flow line passes through the aft compartment, extends into the fore compartment, and has a discharge outlet located in the fore compartment. Preferably, the flow line that the scoop tube is part of enters the fuselage through a bottom wall of the fuselage. Moreover, the first and second flow lines preferably extend through openings in a rear side of the aft compartment of the water tank. In addition, the second flow line preferably extends through an opening in a rear side of the fore compartment of the water tank. Furthermore, the second flow line preferably passes through a wing spar passage located between the fore and aft compartments of the water tank. In the present embodiments, the flow line is part of a flow path along which water scooped from a body of water travels before reaching the water tank, and the flow path preferably does not turn so much that any portion of the flow path is located between lateral sidewalls of the water tank and an adjacent skin of the fuselage. Furthermore, the firefighting float plane preferably includes a fire gate, which includes a water compartment configured to retain a volume of water below the fuselage, with the water compartment of the fire gate being in fluid communication with both the fore and aft compartments of the water tank.

DESCRIPTION OF VARIOUS EMBODIMENTS

Figure 1:
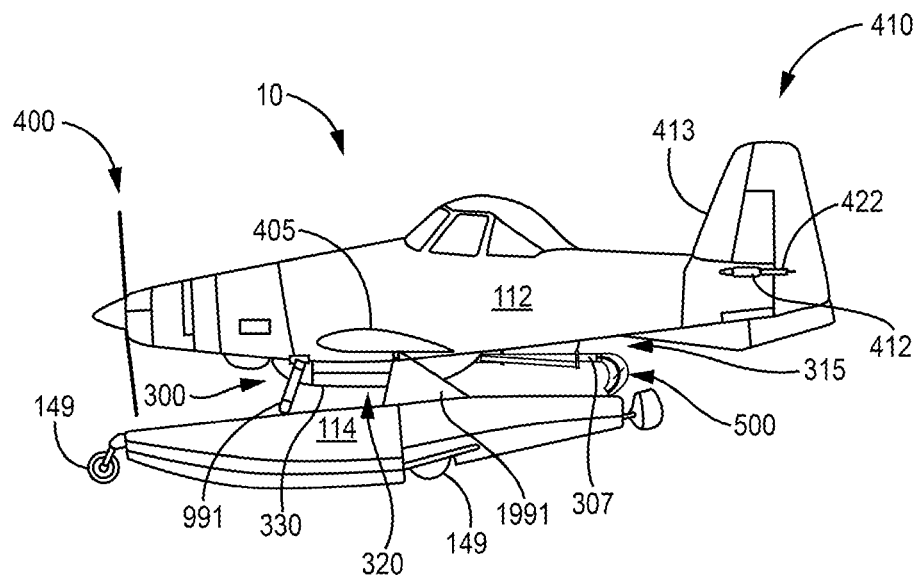
FIG. 1 is a side view of a float plane in accordance with certain embodiments of the present disclosure, with a scoop assembly in a retracted position.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, there are shown various embodiments of an airplane, identified by reference numeral 10, in accordance with the present disclosure. The airplane 10 is a float plane, which is configured to takeoff from, and land on, a water surface (such as the surface of a lake, river, or ocean). The airplane 10 includes a fuselage 112, first 114 and second floats 116, and a wing 405. The first 114 and second 116 floats are spaced apart from each other and connected to the fuselage 112. In more detail, the illustrated floats 114, 116 are mounted to the fuselage 112 such that the floats 114, 116 are held in positions spaced below and laterally offset from the fuselage. Thus, the two floats 114, 116 preferably are spaced apart from each other (e.g., laterally) and spaced apart from the fuselage (e.g., the floats preferably are spaced below the fuselage).

The fuselage 112 defines a main body of the airplane 10. The fuselage 112 generally has a top region and a bottom region (or "belly"), front (or "fore") and rear (or "aft") end regions, and left (or "port") and right (or "starboard") side regions. The front end region includes a nose of the fuselage, and the rear end region includes a tail region of the fuselage. The illustrated nose is equipped with a propeller. Preferably, the aircraft 10 has only a single propeller. In other embodiments, the aircraft includes two propellors, such as a push-pull arrangement defined collectively by a frontward-facing first propellor and a rearward-facing second propellor. If desired, the aircraft can have a turbo-prop or jet engine. More generally, it is to be appreciated that, in accordance with the present invention, a water scoop assembly, spreader bar suspension assembly, or both can be provided advantageously on various types of float planes. Thus, the present airplane can be provided with various fuselage, wing, propeller, and tail arrangements. The illustrated tail region includes a tail 410, which has stabilizing surfaces (e.g., a vertical stabilizer 413 and a horizontal stabilizer 412) so as to provide an empennage.

The first 114 and second 116 floats are a pair of pontoons mounted to the fuselage 112, e.g., so as to increase the buoyancy of the airplane 10. In more detail, the first 114 and second 116 floats make it possible for the aircraft to takeoff from, and land on, a water surface. The illustrated laterally spaced-apart first 114 and second 116 floats provide a desirable level of lateral stability to the airplane 10 when on water. This provides an advantage over a flying boat, which does not include such floats but instead relies on its fuselage for buoyancy. For the present airplane 10, the distance between the exterior sides of the floats preferably is greater than the distance between the left and right side regions of the fuselage.

The first float 114 has a top surface, a bottom surface, a front (or "fore") end, a rear (or "aft") end, and a main region (or "span") extending between the front and rear ends. Similarly, the second float has a top surface, a bottom surface, a front (or "fore") end, a rear (or "aft") end, and a main region extending between the front end and the rear end. Preferably, the bottom of each float has a keel. Moreover, in embodiments involving the scoop assembly 315 described below, the bottom of each float 114, 116 is devoid of a water scoop (e.g., the floats have no keel-mounted water scoops).

The first 114 and second 116 floats can be of any float style and are not limited to the details shown in the figures. Thus, the shape and construction of the floats can vary. For example, the top surface of the first float and the top surface of the second float can be substantially parallel to horizontal, optionally with a slight downward taper at front ends. Alternatively, the top surfaces of the first and second floats can include no tapered sections (i.e., only straight sections), or could curve downwardly or upwardly at either or both of the front and rear ends. The bottom surface of the first float 114 and the bottom surface of the second float 116 can include straight sections, as well as curved sections. For example, the bottom surfaces can curve and/or taper upwardly at one or both of their front and rear ends. In other embodiments, the bottom surfaces of the first and second floats may be parallel to horizontal or concave. Various other float configurations are contemplated and within the scope of this disclosure. If desired, the floats can each have an elongated generally tubular shape. A variety of advantageous float styles can be obtained commercially from Wipaire, Inc., of South St. Paul, Minnesota, USA.

In the embodiments illustrated, each of the floats 114, 116 has a front end that is substantially aligned with (in terms of its location along a longitudinal axis of the fuselage), or located fore of, a propellor 400 of the airplane 10, or at least substantially aligned with, or located fore of, a nose of the fuselage. Thus, as can be appreciated by referring to FIGS. 1, 2, and 22, a front end region of each float 114, 116 can optionally be located directly below the propeller 400 (again, just in terms of its location along the longitudinal axis of the fuselage). While this is by no means required, it can optionally be the case for any embodiment of the present disclosure. Furthermore, the optional front wheels 149 on the illustrated floats 114, 116 may be substantially aligned with, or located fore of, a propellor 400 of the airplane 10, or at least substantially aligned with, or located fore of, a nose of the fuselage. This can optionally be the case for any embodiment of the present disclosure. It is to be appreciated, however, that this is not required either. For example, the floats may be shorter and/or positioned further aft relative to the fuselage.

The illustrated fuselage 112 extends further aft than do the floats 114, 116. While this is not required, it can optionally be the case for any embodiment of the present disclosure.

If desired, the first and second floats can have walls comprising (e.g., consisting essentially of, or consisting of) a composite material. Additionally or alternatively, the fuselage or certain portions thereof can have walls comprising (e.g., consisting essentially of, or consisting of) a composite material. When provided, the composite material preferably comprises fiberglass, although other composite materials, such as carbon fiber, can be used. In some cases, the walls of the first and second floats, and/or the walls of the fuselage, can be formed entirely of composite material (other than optionally having some metal components), or the float and/or fuselage walls can include some areas formed of a composite material while other areas are formed of a non-composite material (e.g., metal). In preferred embodiments, though, the fuselage walls are aluminum or another aircraft metal. Likewise, the float walls can advantageously be aluminum or another aircraft metal. Another option is for the fuselage walls to be aluminum or another aircraft metal, while the float walls are formed of composite material.

Preferably, the airplane 10 is an amphibious aircraft, i.e., an aircraft configured to takeoff from, and land on, both land and water. To provide this dual capability, retractable wheels 149 preferably are attached to each of the first 114 and second 116 floats. This can optionally be the case for any embodiment of the present disclosure. When provided, the wheels 149 preferably are movable between an extended position and a retracted position. During operation, the desired position of the wheels 149 will, of course, depend on whether the airplane 10 will be taking off from, or landing on, land or water. When in the extended position, each wheel 149 projects downwardly from a respective one of the first 114 and second 116 floats such that the airplane 10 is configured to takeoff from, and land on, a land surface (such as a ground landing strip). When in the retracted position, the wheels 149 are retracted upwardly (e.g., into the floats) such that the airplane 10 is configured to takeoff from, and land on, a water surface. Although each of the first 114 and second 116 floats is shown as having three wheels 149, different numbers of wheels can be provided for each float, such as only two wheels or more than three wheels. Moreover, in certain embodiments, the present float plane does not include any such wheels, and thus is not amphibious. Reference is made to FIGS. 21-24.

One or more front wheels 149 can be attached to each of the front ends of the first 114 and second 116 floats, while one or more rear (or "midpoint" or "main") wheels 149 are attached to a main region (e.g., a middle region) of the first float 114, and one or more rear (or "midpoint" or "main") wheels are attached to a main region (e.g., a middle region) of the second float 116. The locations of the wheels on the floats, however, can vary from the locations shown in the drawings without departing from the spirit and scope of the present invention.

As illustrated in FIGS. 1, 2, 5, 7, 8, and 19-24, the first and second floats 114, 116 can optionally be equipped with water rudders. Advantageous water rudders are commercially available from Wipaire, Inc. An alternative is to provide thrusters, instead of water rudders.

The airplane 10 preferably is a firefighting airplane configured to suppress and/or combat wildfires, e.g., by dropping water (from the airplane while in flight) onto a fire below. To achieve this function, the airplane 10 preferably is equipped with a water tank 300 having open and closed configurations. The water tank 300 has a bottom that is closed when the water tank is in its closed configuration and that is open when the water tank is in its open configuration.

In the present figures, the water tank is identified by reference numeral 300. The water tank (or "hopper") 300 can optionally comprise two compartments 300F, 300A. As shown in FIGS. 28-32 and 34-35B, the water tank 300 can advantageously comprise first 300F and second 300A compartments. When provided, the first 300F and second 300A compartments preferably are located one in front of the other, optionally with a wing spar passage located between the two compartments. Thus, the first compartment 300F can be a fore compartment, while the second compartment 300A is an aft compartment. In such cases, the two compartments can optionally be configured such that a wing spar extends between them. The one or more compartments of the water tank 300 may, for example, comprise fiberglass tank walls, although tank walls formed of various polymers, aluminum, or another aircraft metal may be used. In other embodiments, the water tank has only a single water tank compartment of the desired total tank capacity.

When provided, the water tank 300 (whether it has one or multiple compartments) preferably has a capacity of less than 1,400 gallons, or less than 1,200 gallons, e.g., in a range of 400-1,175 gallons, such as 600-1,150 gallons. In some cases, the water tank capacity is about 800-900 gallons.

Preferably, the airplane 10 is equipped with a door 330, e.g., a bomb bay door, at the bottom of the water tank 300. The door 330 is movable between an open position and a closed position. The door 330 is closed when the water tank 300 is in its closed configuration, and the door 330 is open when the water tank 300 is in its open configuration. In certain embodiments, the door 330 comprises a plurality of panels that adjoin one another (so as to close the bottom of the water tank) when the door 330 is closed and are spaced apart from one another (so as to open the bottom of the water tank) when the door 330 is open. By opening the door 330, water can be dumped from the water tank 300 onto a fire below the airplane 10.

The door 330 preferably is part of a fire gate 320. It is suitable to use any of a variety of commercially available fire gates, such as the Air Tractor Gen III FRDS fire gate (which is factory standard on the AT-802F aircraft from Air Tractor Inc., of Olney, Texas, USA), the Hydromax fire gate (available from Alaska Aviation Services, LLC, of Brinkley, Arkansas, USA), or the Hatfield fire gate (available from Turbine Conversions, Ltd., of Nunica, Michigan, USA).

Thus, the airplane 10 can optionally include a fire gate 320, e.g., below the water tank 300, such that the fire gate projects downwardly, at least in part, below the fuselage 112. Preferably, the fire gate 320 includes a bottom water compartment 322 configured to hold a volume of water below the fuselage 112. This is perhaps best shown in FIG. 29. The bottom water compartment 322 of the illustrated fire gate 320 is in fluid communication with one or more compartments (which in these embodiments may be referred to as "main" or "upper" compartments) 300A, 300B of the water tank 300. In one example, the bottom water compartment 322 is configured to hold about 10-30 gallons of water, such as about 20 gallons of water. Each of the two illustrated main compartments 300A, 300B has greater capacity than the illustrated bottom water compartment 322. While the bottom water compartment 322 is not shown in FIG. 31A, 31B, 35A, or 35B (since other details are the focus of those illustrations), water compartment 322 preferably is provided in those embodiments too. Thus, it will be appreciated that there preferably is a bottom water compartment 322 in fluid communication with both of the illustrated main compartments 300F, 300A, with the bottom water compartment located adjacent, and configured to receive water from, the bottom end regions of both main compartments.

Figure 29:
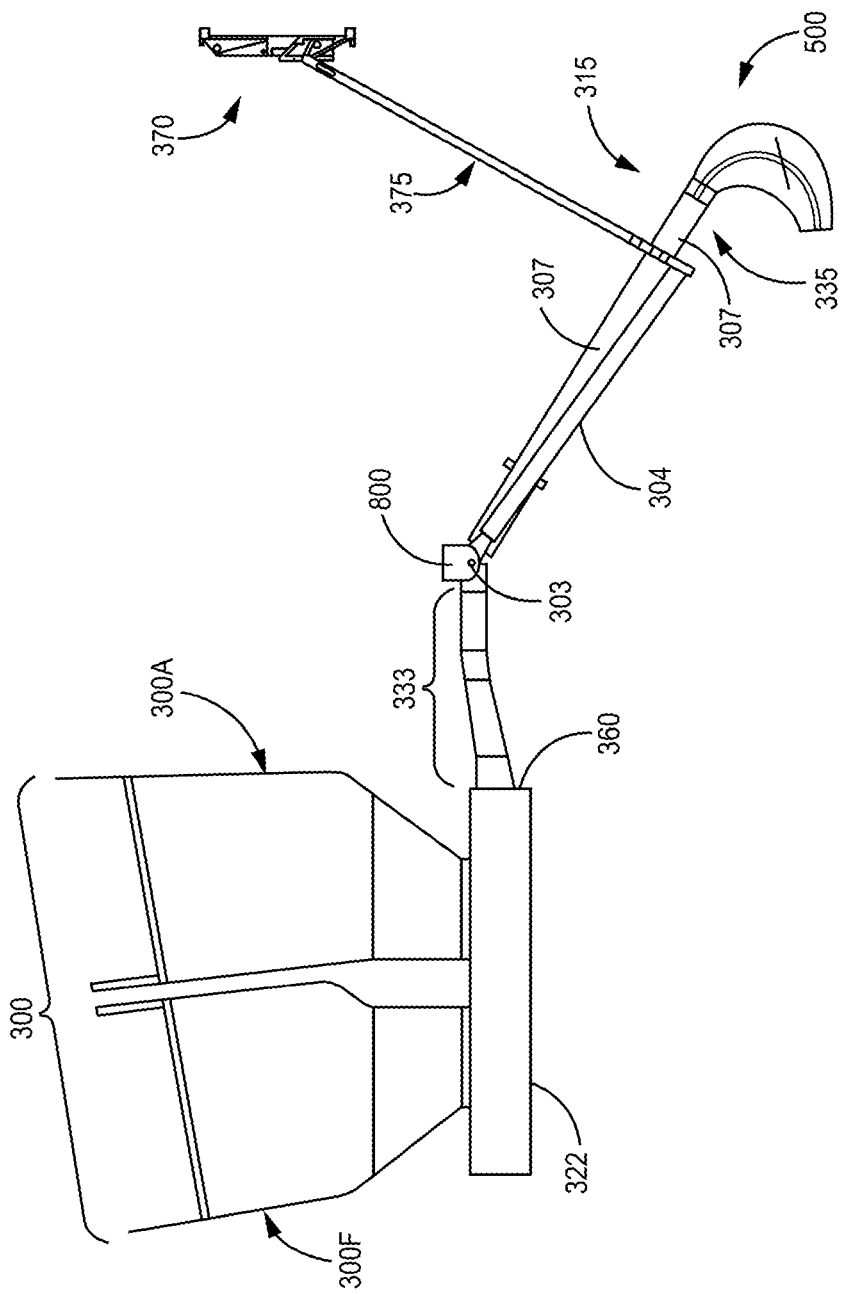
FIG. 29 is a schematic side view of the scoop plumbing arrangement of FIG. 28.

When provided, the water compartment 322 of the fire gate 320 can optionally include a rear wall 360. In certain embodiments of this nature, the airplane 10 includes an elongated scoop tube 307 configured to deliver water into the water compartment 322 of the fire gate 320 (directly or via one or more flow line components and/or sections between the scoop tube 307 and the water tank 300, such as an optional flexible coupling, an optional deceleration region, and/or another flow line section) through a section of the rear wall 360 that is located below the fuselage 112. One non-limiting example is shown in FIG. 29.

Figure 28:
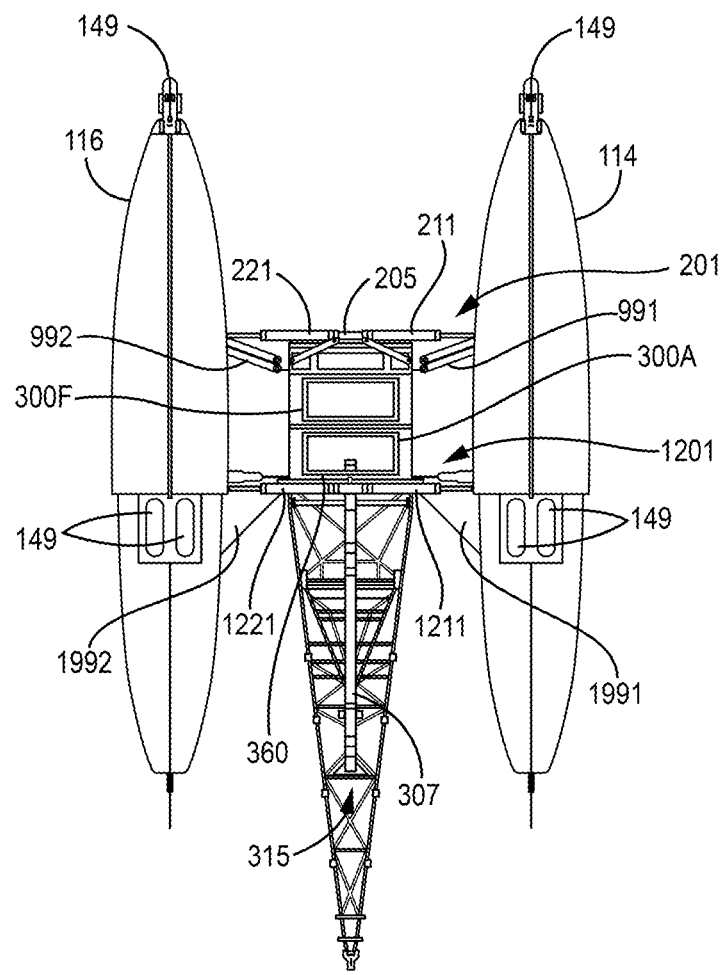
FIG. 28 is a partially broken-away schematic bottom view of a float plane having a scoop plumbing arrangement in accordance with a first group of embodiments.
Figure 34:
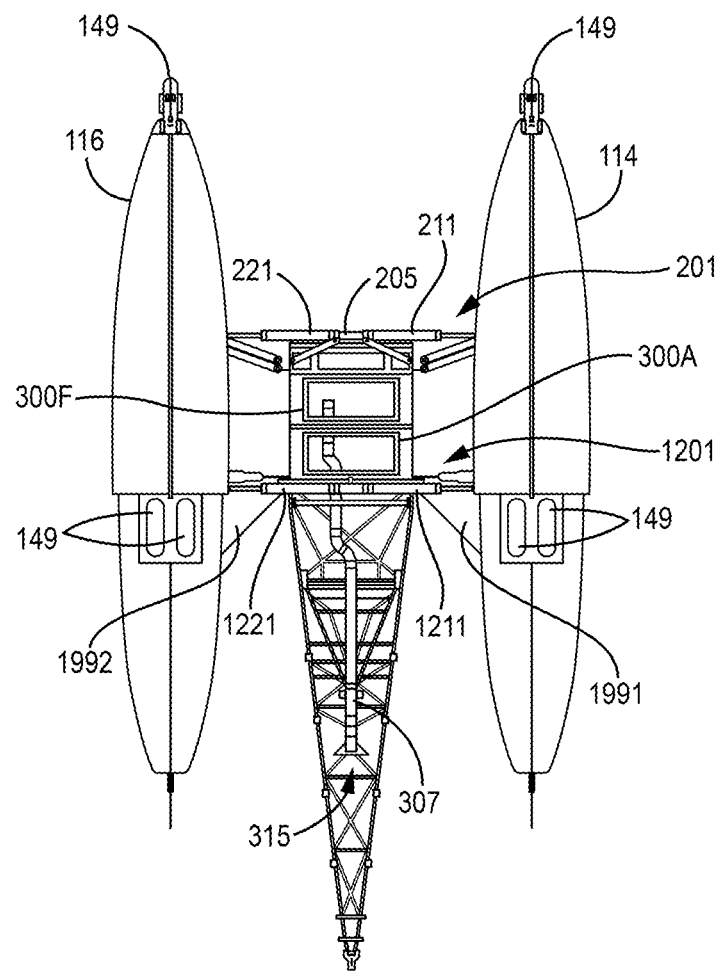
FIG. 34 is a partially broken-away schematic bottom view of a float plane having a scoop plumbing arrangement in accordance with a third group of embodiments.

Thus, in some embodiments, a flow path for water retrieved during a filling operation is quite direct. In certain embodiments of this nature, the airplane 10 includes a scoop assembly 315 configured such that the flow path along which water scooped from a body of water travels before reaching the water tank 300 is devoid of lateral turns. In such cases, the entire flow path may be aligned with (e.g., so the water flow path is in the same plane as) the fuselage centerline. Reference is made to FIG. 28. In other embodiments, the airplane 10 includes a scoop assembly 315 comprising an elongated scoop tube 307 (which preferably is external to the fuselage and aligned with a fuselage centerline) configured such that the flow path along which water scooped from a body of water travels before reaching the water tank 300 does not turn so much that any portion of the flow path is located between the lateral sidewalls of the water tank and the fuselage wall (or "skin"). Reference is made to FIGS. 28 and 34.

For embodiments wherein the airplane has a water tank, it preferably is equipped with a hopper overflow valve that allows water to drain from the water tank if it receives more water than it can hold when completely full.

The water tank can optionally include (or be operably coupled with) a gel or foam tank configured to hold a fire-retardant material. The fire-retardant material in the optional gel or foam tank can be a fire-retardant gel or foam. More generally, the fire-retardant material can be any material suitable for combating and/or suppressing wildfires. Thus, the water tank 300 can be filled with pure water, or water mixed with another fire-retardant material, such as gel, foam, powder, or a liquid concentrate. In some cases, one or more gel or foam tanks are located within the fuselage, e.g., adjacent the water tank. Additionally or alternatively, one or more gel or foam tanks can optionally be located within the floats, e.g., one gel or foam tank may be located in each float. When provided, one or more gel or foam tanks within the fuselage can have, for example, up to 20 US gallons of gel or foam capacity, such as in a range of from 10 to 20 US gallons. Additionally or alternatively, one or more gel or foam tanks located inside the floats can have up to 60 US gallons of gel or foam capacity, such as in a range of from 10 to 60 US gallons.

The airplane 10 preferably has an engine power in a range of between 1,300 horsepower and 4,000 horsepower. For example, the engine power can be between 1,400 horsepower and 2,500 horsepower. In one non-limiting example, the engine power is about 1,600 HP.

The airplane 10 has one or more seats for seating one or more persons. Where a two-place configuration is provided, the second seat can advantageously serve as an observer station. Thus, the airplane 10 in any embodiment of the present disclosure can optionally be a one-place aircraft or a two-place aircraft.

Scoop Assembly

In some embodiments, the airplane 10 is a firefighting float plane comprising a fuselage 112, a wing 405, a water tank 300, first and second floats 114, 116, and a scoop assembly 315. Thus, the airplane 10 can optionally include a scoop assembly 315 configured to retrieve water from a lake, river or other body of water (e.g., while the airplane is moving along the surface of the body of water). When provided, the scoop assembly 315 is in fluid communication with the water tank 300, such that water retrieved by the scoop assembly 315 is delivered into the water tank 300.

The illustrated scoop assembly 315 is adjustable between a first configuration (or "retracted configuration") and a second configuration (or "extended configuration"). The scoop assembly 315 (or a section thereof) preferably is rotatable (e.g., pivotable) so as to adjust the scoop assembly 315 between the first and second configurations. The scoop assembly 315 (or a section thereof) is retracted and/or stowed when in the first configuration, and is configured to retrieve water when in the second configuration. In more detail, the scoop assembly 315 (or a section thereof) extends downwardly (e.g., between the floats 114, 116), and is configured to project into a body of water, when in the second configuration. The illustrated scoop assembly 315 is adjustable from the first configuration to the second configuration by moving (e.g., pivoting) downwardly, and is adjustable from the second configuration to the first configuration by moving (e.g., pivoting) upwardly. Thus, in some embodiments, the scoop assembly 315 is adjustable by pivoting between the first and second configurations. In other embodiments, the scoop assembly is adjustable between the first and second configurations in other ways, such as by telescoping or moving linearly up and down.

When in the second (or "extended") configuration, the scoop assembly 315 can be lowered into a body of water by flying the airplane 10 along the water surface, e.g., by having the first 114 and second 116 floats skim across the water surface. While the airplane 10 flies along the water in this manner (with the floats skimming across the surface of the body of water) the scoop assembly 315 simultaneously "scoops up" water. Water retrieved by the scoop assembly 315 in this manner flows upwardly into the water tank 300.

Preferably, the scoop assembly 315 (or part thereof) is outside of (i.e., external to) the fuselage 112. In addition, the scoop assembly 315 (or part thereof) preferably is aligned with a longitudinal axis of the fuselage 112 (or "fuselage centerline"). For example, an elongated scoop tube 307 of the illustrated scoop assembly 315 is aligned with (e.g., so its water flow path is in the same plane as) the fuselage centerline (which extends longitudinally and is midway between the left and right sides of the fuselage). In more detail, the scoop assembly 315 (or at least a portion thereof, e.g., at least 50% of the length of an elongated scoop tube 307 thereof) preferably is external to the fuselage 112 and located aft of the wing 405. Furthermore, the scoop assembly 315 (or at least a portion thereof, e.g., at least 50% of the length of an elongated scoop tube 307 thereof) is in some cases positioned so as to be substantially aligned with (e.g., in terms of being directly below) the cockpit of the airplane 10. Reference is made to FIGS. 1, 2, and 22-24. These details, however, are not required. Rather, the scoop assembly can have various other configurations.

Part or all of the elongated scoop tube 307 (e.g., a least part of the scoop tube that is external to the fuselage) can optionally have an oblong cross-sectional configuration (not shown), so as to have more of an airfoil shape and help with aerodynamics, hydrodynamics, or both.

Preferably, the scoop assembly 315 includes a retract system 370. One non-limiting example is shown in the drawings, and is perhaps best appreciated by referring to FIGS. 5-9, 11, 19, 20, 23, 24, 29, 31A, and 31B. Here, a cable or arm 375 is operably coupled with (e.g., attached at one end to) the elongated scoop tube 307. Additionally or alternatively, the cable or arm 375 can be attached to a strut 304 or another part of the scoop assembly 315. When provided, the cable retract system 370 preferably includes a motor configured to selectively retract or extend the cable or arm 375, thereby either lifting the elongated scoop tube 307 to a retracted (or "stowed") position or lowering the elongated scoop tube to an extended (or "deployed") position. A control panel in the cockpit can optionally be provided to initiate moving the elongated scoop tube between its retracted and extended positions. The particular configuration and details of the illustrated retract system are not limiting. Various other retract systems can be used.

Figure 25:
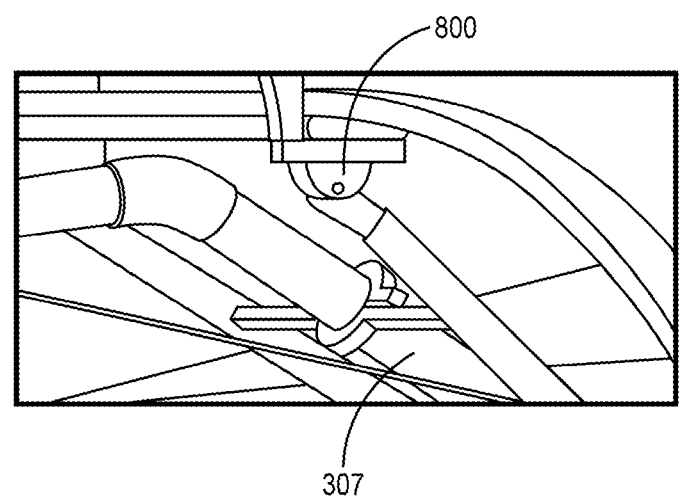
FIG. 25 is a broken-away detail view of a mount region of the scoop assembly of FIGS. 21-24.
Figure 26:
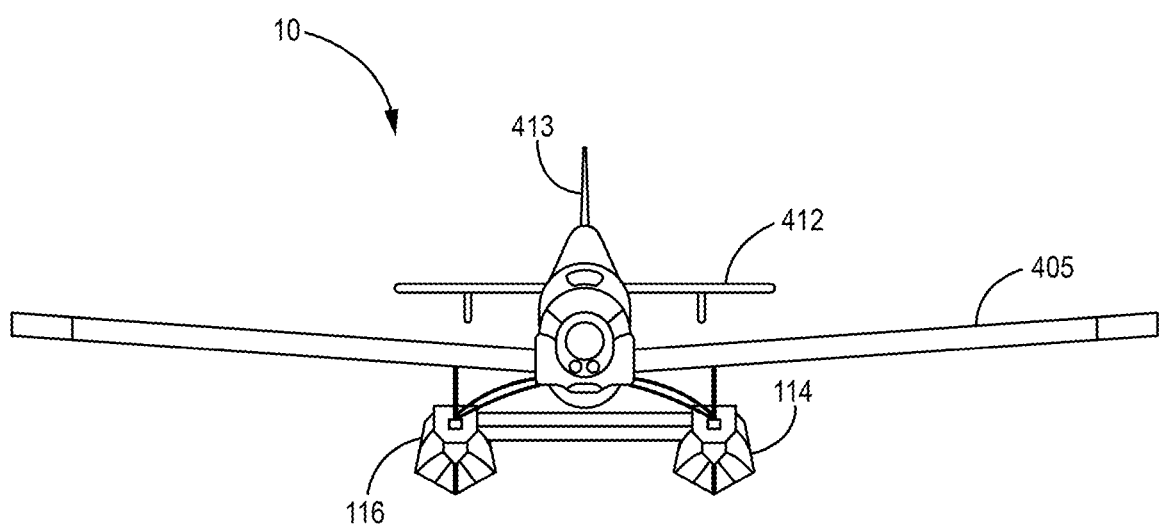
FIG. 26 is a front view of the float plane of FIG. 21.
Figure 27:
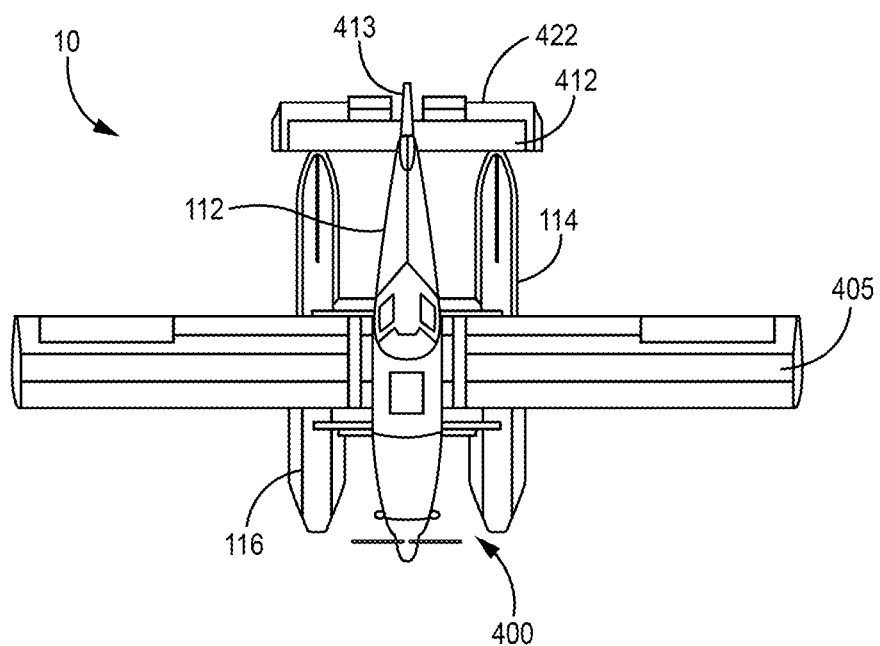
FIG. 27 is a top view of the float plane of FIG. 21.

The scoop assembly 315 preferably includes a framework comprising one or more struts 304 providing additional structural support for the scoop tube 307. Additionally or alternatively, there can optionally be a flexible coupling 399 between the scoop tube 307 and the water tank 300. This is perhaps best seen in FIG. 9. Another example is shown in FIG. 25. Furthermore, one or more flow lines preferably extend from the flexible coupling 399 (when provided), or from the scoop tube 307, to the water tank 300.

The plumbing configuration for the scoop assembly can be provided in different forms. For example, water delivery from the scoop assembly 315 into the water tank 300 can pass through an opening in a rear wall 360 of a water compartment 322 of a fire gate 320 that is in fluid communication with the water tank 300. This is best appreciated by referring to FIGS. 28 and 29. As an alternative, water delivery from the scoop assembly 315 into the water tank 300 can involve a branching of a single water flow line into two lines (e.g., at a "Y connection") that deliver water into the water tank 300 through openings in left (or "port") and right (or "starboard") sidewalls of the water tank. This is best appreciated by referring to FIGS. 30, 31A, and 31B. As another alternative, water delivery from the scoop assembly 315 into the water tank 300 can involve a branching of a single water flow line into two lines (e.g., at a "Y connection") that deliver water into the water tank 300 through openings in rear walls 364, 366 of the water tank. This is best appreciated by referring to FIGS. 34-35B. Various other suitable plumbing configurations will be apparent to those of ordinary skill in the present field, given this teaching as a guide.

Figure 30:
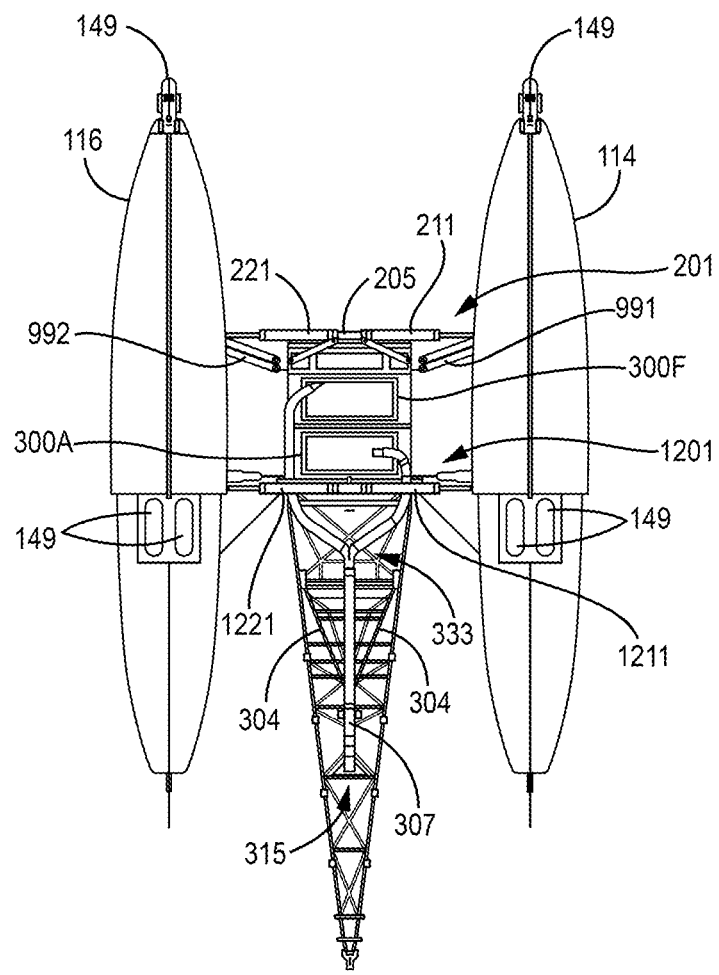
FIG. 30 is a partially broken-away schematic bottom view of a float plane having a scoop plumbing arrangement in accordance with a second group of embodiments.
Figure 31A:
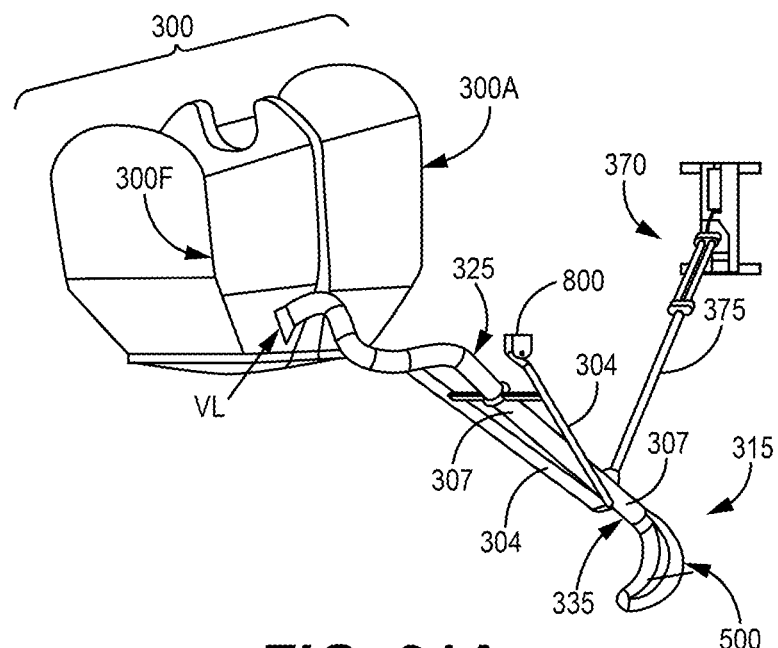
FIG. 31A is a first schematic perspective view of the scoop plumbing arrangement of FIG. 30.
Figure 31B:
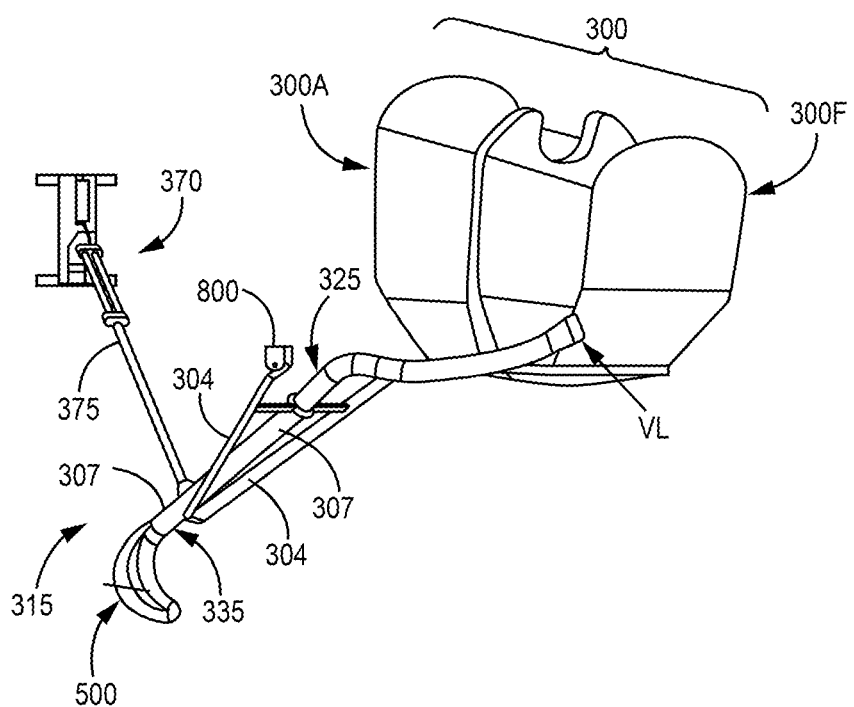
FIG. 31B is a second schematic perspective view of the scoop plumbing arrangement of FIG. 30.

FIGS. 30, 31A, and 31B exemplify one group of embodiments wherein a single scoop tube 307 configured to deliver water to the water tank 300 branches into first and second flow lines positioned to respectively deliver water into first and second inlets of the water tank 300. In FIG. 30, where the water flow path branches into first and second flow lines, those two flow lines preferably extend generally away from each other, e.g., toward opposite sides of the fuselage. In FIGS. 30, 31A, and 31B, the first and second flow lines are positioned to respectively deliver water into first and second compartments 300F, 300A of the water tank 300. Here, the first 300F and second 300A compartments are located one in front of the other. Alternatively, the first and second flow lines can be positioned to respectively deliver water into first and second inlets respectively located on opposed first and second sides of a single compartment of the water tank. In the present embodiment group, a single scoop tube 307 can optionally be aligned with (e.g., so the water flow path is in the same vertical plane as) the fuselage centerline. Moreover, the single scoop tube 307 preferably is located at least in part (and in some cases, entirely) outside of the fuselage 112. Additionally or alternatively, the noted first and second flow lines preferably are located at least in part (and in some cases, entirely) inside the fuselage 112.

Figure 35A:
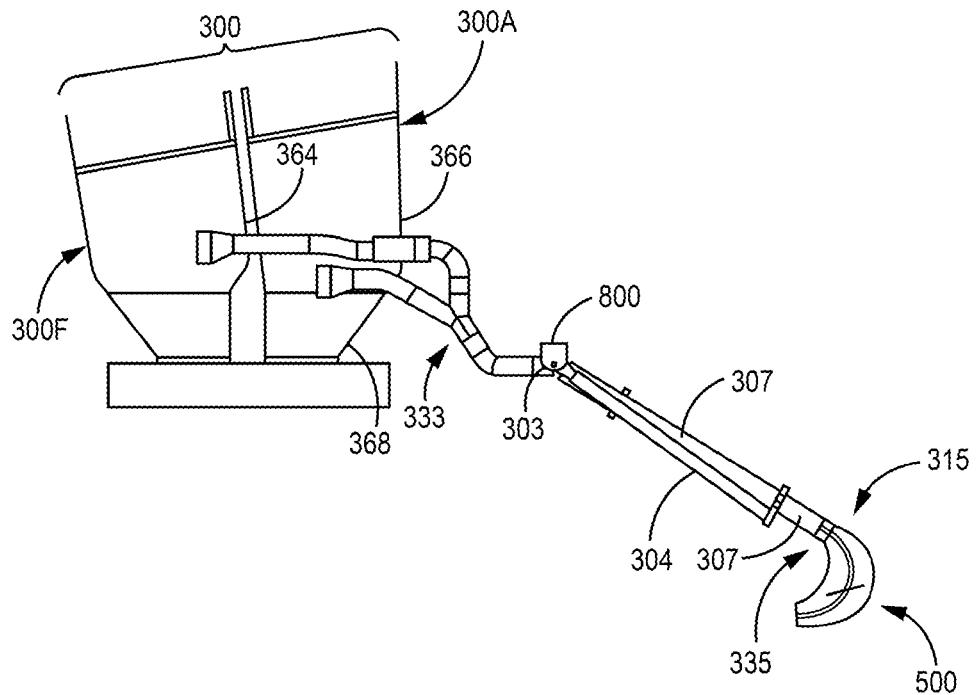
FIG. 35A is a schematic side view of the scoop plumbing arrangement of FIG. 34.
Figure 35B:
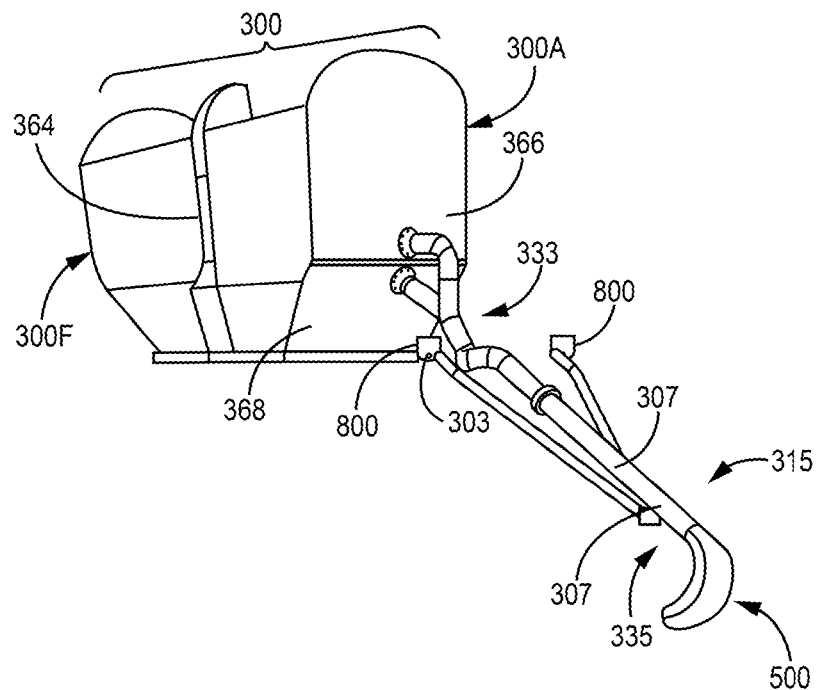
FIG. 35B is a schematic perspective view of the scoop plumbing arrangement of FIG. 34.

FIGS. 34, 35A, and 35B exemplify another group of embodiments wherein a scoop tube 307 is part of a flow line that branches into first and second flow lines positioned to respectively deliver water into first and second inlets of the water tank 300. In these figures, the first and second flow lines are positioned to respectively deliver water into first and second compartments 300F, 300A of the water tank 300. Here again, the first 300F and second 300A compartments are located one in front of the other. In the present embodiment group, a single scoop tube 307 can optionally be aligned with (e.g., so the water flow path through tube 307 is in the same vertical plane as) the fuselage centerline. Moreover, the single scoop tube 307 preferably is located at least in part (and in some cases, entirely) outside of the fuselage 112. Additionally or alternatively, the noted first and second flow lines preferably are located at least in part (and in some cases, entirely) inside the fuselage 112.

With continued reference to FIGS. 34, 35A, and 35B, a single scoop tube 307 is part of a flow line that branches into first and second flow lines positioned to respectively discharge water into fore and aft compartments 300F, 300A of the water tank 300. Here, both of the flow lines enter the aft compartment 300A, and one of the flow lines has its outlet located in the aft compartment, while the other flow line passes through the aft compartment and into the fore compartment 300F and has its outlet located in the fore compartment. A plumbing configuration of this nature can optionally be provided in any embodiment of the present disclosure.

Thus, in certain embodiments, one of the flow lines passes through the aft compartment 300A, optionally through a wing spar passage, and into the fore compartment 300F where it has its outlet. In FIGS. 34, 35A, and 35B, the two illustrated flow lines enter the aft compartment 300A through a rear side (e.g., through one or more rear walls 366, 368) of the aft compartment. Furthermore, one of the two illustrated flow lines extends through the aft compartment 300A and enters the fore compartment 300F through a rear side (e.g., through a rear wall 364) of the fore compartment. This is best shown in FIG. 35A. An arrangement of this nature can optionally be provided in any embodiment of the present disclosure.

In embodiments where a scoop tube 307 is part of a single flow line that branches into first and second flow lines, the single flow line (e.g., a pipe or tube section thereof) preferably enters the fuselage through a bottom wall of the fuselage, while the first and second flow lines preferably are located within the fuselage. In addition, the branching of the single flow line into two flow lines (e.g., a "Y connection") preferably is located within the fuselage. These optional features are present, for example, in the embodiments of FIGS. 30-31B and 34-35B.

In certain embodiments, the flow path along which water scooped from a body of water travels before reaching the water tank 300 does not turn so much that any portion of the flow path is located between the lateral sidewalls of the water tank and the fuselage wall. Embodiments of this nature provide an advantageous, direct flow path to the water tank.

If desired, rubber valves VL or the like can be provided inside the water tank 300 at each inlet to the water tank. For example, a rubber valve VL is shown inside the aft compartment 300A in FIG. 31A. Similarly, a rubber valve VL is shown inside the fore compartment 300F in FIG. 31B.

Regardless of the particular plumbing route to the water tank 300, the plumbing configuration for the scoop assembly 315 can optionally include a deceleration region 333 configured to slow the flow of water before it enters the water tank 300. One example is shown in FIG. 29. Here, the deceleration region 333 comprises a tube (e.g., pipe) section having an inner diameter that increases in the direction of flow toward the water tank 300. In FIG. 29, for example, the inner diameter of the tubing increases from 4 inches to 5 inches or more in the illustrated deceleration region. It is to be appreciated, however, that these particular dimensions are merely exemplary/non-limiting.

In FIGS. 30, 31A, and 31B, a deceleration region 333 is provided where the scoop tube 307 branches into first and second flow lines. As one example, the diameter of the scoop tube 307 may be 4 inches, while the diameter of each of the first and second flow lines is 5 inches or more. Here again, the noted dimensions are not limiting.

By incorporating a deceleration region into the plumbing configuration for the scoop assembly, it is possible to slow the flow of water before it enters the water tank. This can advantageously prevent damage to interior components of the water tank. It can also lessen turbulence so that measurement devices work better.

In some embodiments wherein the airplane 10 includes a scoop assembly 315, the scoop assembly is configured to produce a reduced pitch-down (or "nose down") moment during a filling operation (i.e., while the airplane is moving along the surface of a body of water with the scoop assembly delivering water from the body of water to the water tank on the airplane). Due to the change in direction (acceleration) of the scooped water and the drag force of the scoop assembly 315 itself, a pitch-down moment on the airplane 10 results from operating the scoop assembly during the filling operation. By reducing the pitch-down moment created by the scoop assembly during the filling operation, certain advantages are gained. For example, pilot workload (e.g., pulling back on the stick during the filling operation) is reduced. Moreover, the total downward reaction force on the horizontal tail is reduced, thereby reducing the amount of lift necessary to lift the aircraft an equal amount.

Preferably, the scoop assembly 315 is configured to produce a pitch-down moment of less than 10,000 foot pounds on the firefighting float plane during a filling operation. The pitch-down moment can be, for example, in a range of 100-7,500 foot pounds. In some cases, the pitch-down moment is less than 5,000 foot pounds. In one example, the scoop assembly 315 is configured to produce a pitch-down moment of about 4,150 foot pounds. The airplane 10 and its scoop assembly 315 may be configured, for example, such that a pitch-down moment in any one or more of the foregoing ranges is produced when the engine thrust is 2,500 pounds. It will be appreciated, however, that the engine thrust can be varied within a suitable range during a filling operation, e.g., based on the particular design of the airplane, the operating conditions, and pilot preference.

Preferably, the firefighting float plane has a tail 410 with a horizontal stabilizer 412 equipped with an elevator 422. In the present embodiments, the tail 410 is configured to produce a downward neutralizing force creating a pitch-up moment that offsets (i.e., is the same magnitude as, so as to oppositely react/cancel out) the pitch-down moment produced by the scoop assembly during a filling operation. In such cases, the scoop assembly 315 and tail 410 preferably are configured (and operated) such that the downward neutralizing force is less than 500 pounds, such as in a range of 25 to 350 pounds. In one example, the scoop assembly 315 and the tail 410 are configured (and operated) such that the tail 410 produces a downward neutralizing force of about 218 pounds. The airplane 10 and its tail 410 and scoop assembly 315 may be configured, for example, such that a downward neutralizing force in any one or more of the foregoing ranges is produced when the engine thrust is 2,500 pounds. As noted above, however, this engine thrust example is by no means limiting. Rather, the engine thrust can be varied within a suitable range during the filling operation.

Figure 6:
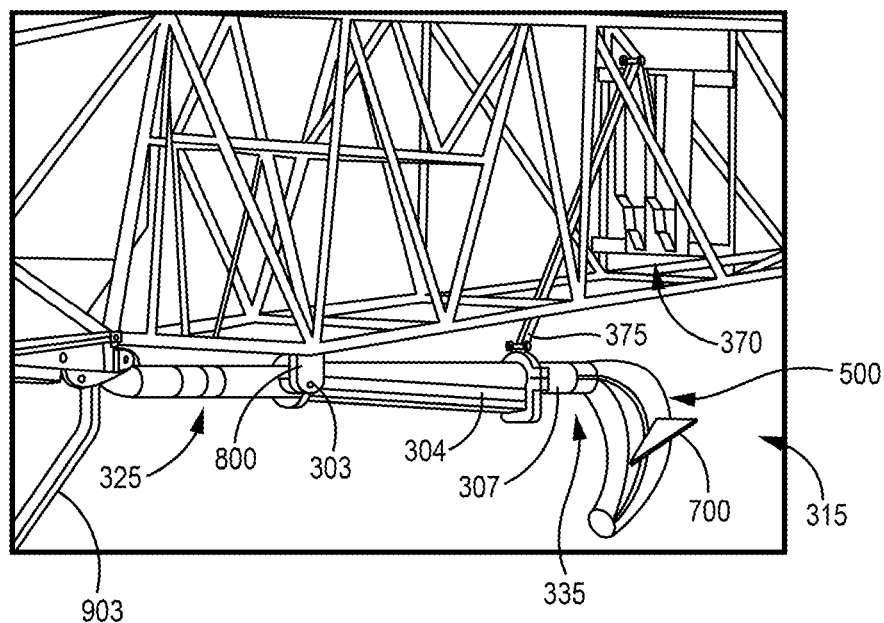
FIG. 6 is a detail view of the scoop assembly area delineated by the dashed-line rectangle of FIG. 5, with the first float omitted for illustration purposes.
Figure 7:
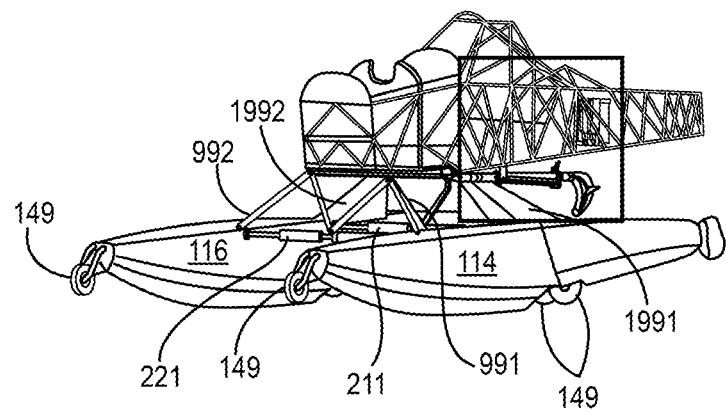
FIG. 7 is a partially broken-away perspective view of the float plane of FIG. 1, with fuselage skin omitted for illustration purposes, and showing the scoop assembly in the extended position.
Figure 8:
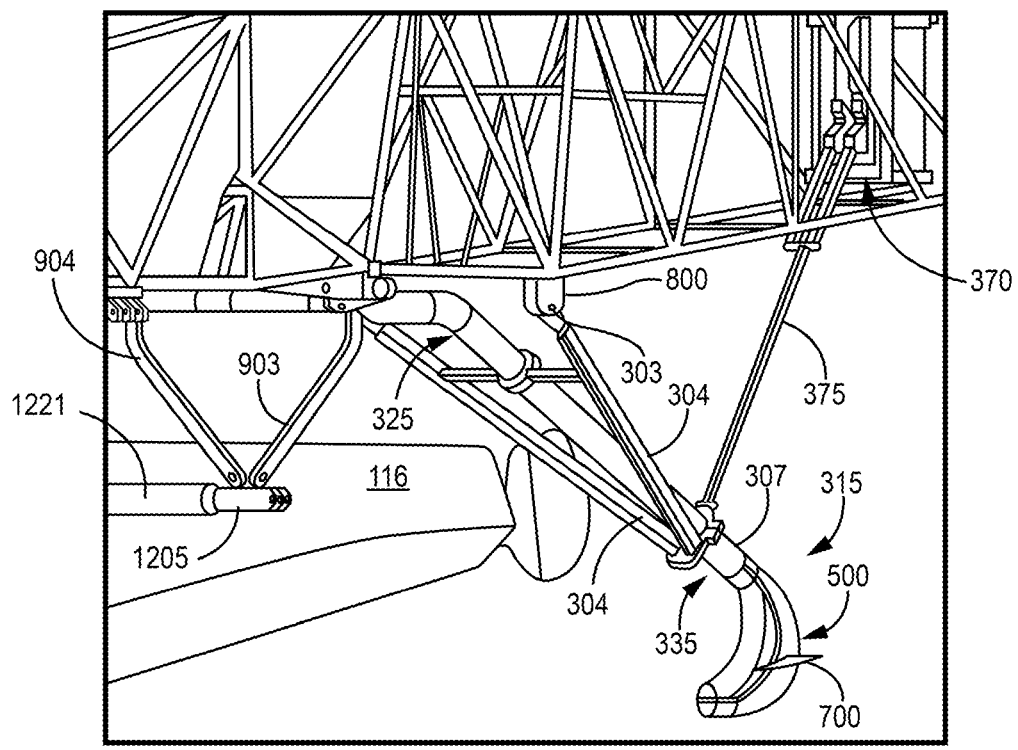
FIG. 8 is a detail view of the scoop assembly area delineated by the dashed-line rectangle of FIG. 7, with the first float omitted for illustration purposes.
Figure 9:
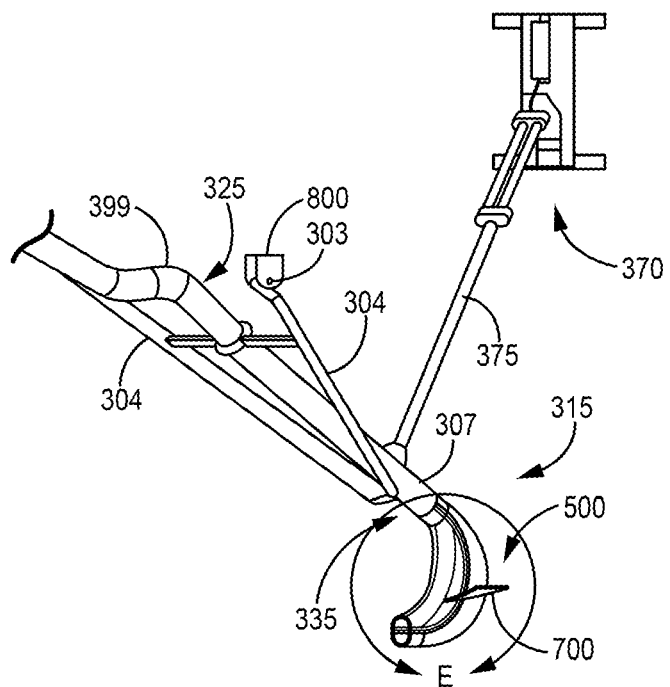
FIG. 9 is a broken-away perspective view of the scoop assembly of FIG. 1, with the scoop assembly in the extended position.
Figure 10:
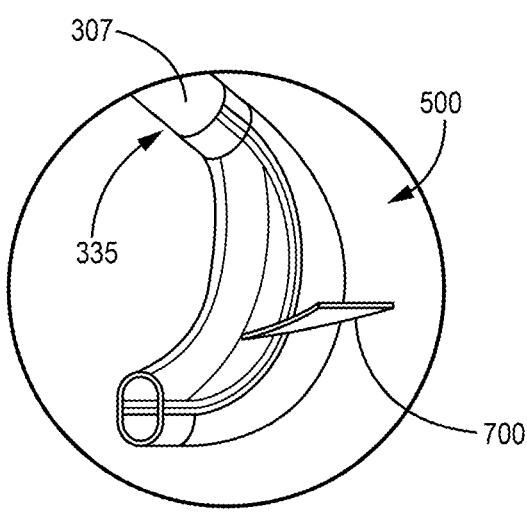
FIG. 10 is a detail view of a scooping apparatus of the scoop assembly shown in FIG. 9 in an area delineated by the dashed-line circle of FIG. 9.
Figure 11:
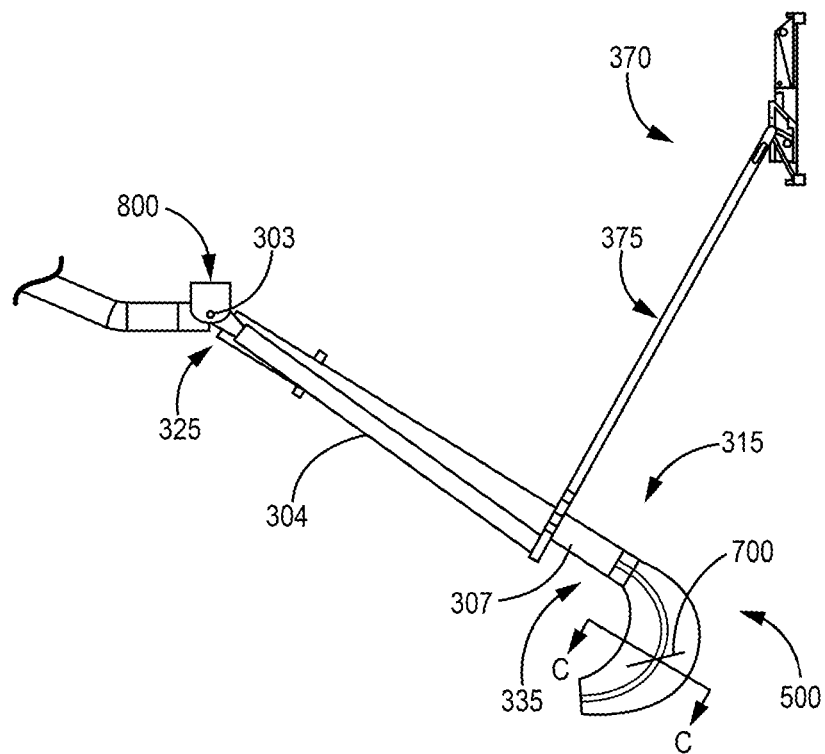
FIG. 11 is a broken-away side view of the scoop assembly shown in FIG. 9 with the scoop assembly in the extended position.

In some embodiments wherein the airplane 10 includes a scoop assembly 315, the scoop assembly comprises an elongated scoop tube 307 and has a pivot point 303 about which the elongated scoop tube 307 is pivotable between a retracted position (or "stowed position") and an extended position (or "deployed position"). This can be appreciated by referring to various figures of the present disclosure, and is perhaps best shown in FIGS. 6, 8, 9, and 11. As illustrated, the pivot point 303 can optionally be further aft than the wing 405. Additionally or alternatively, the pivot point 303 can optionally be located beneath a bottom of the fuselage 112. Reference is made to FIGS. 6 and 8.

Thus, in some embodiments the firefighting float plane includes a scoop assembly 315 comprising an elongated scoop tube 307 that has a stowed position and a deployed position. In embodiments of this nature, the elongated scoop tube 307 when in the stowed position preferably is carried along an underside of the fuselage 112, and the elongated scoop tube 307 when in the deployed configuration projects downwardly away from the fuselage 112 and extends between the first 114 and second 116 floats.

The illustrated scoop tube 307 has a proximal end 325 and a distal end 335. Both the proximal 325 and distal 335 ends of the scoop tube 307 are open to permit water to pass into, through, and out of the scoop tube, e.g., so as to be configured to deliver water toward the water tank 300. The proximal end 325 of the scoop tube 307 is closer to the water tank 300 than is the distal end 335. When the scoop tube 307 is in the deployed position, its projects downwardly from the fuselage 112 and extends between the two floats 114, 116. When the scoop tube 307 is in the stowed position, it preferably is generally or substantially parallel to a longitudinal axis of the airplane 10. This type of arrangement allows the distal end 335 of the scoop tube 307 to be lowered/deployed when needed to fill the water tank 300 and subsequently raised/stowed when not in use.

To facilitate water retrieval, the distal end 335 of the scoop tube 307 preferably is: (i) arcuate (or otherwise bent, curved, or angled) so as to face in substantially the same direction as the direction of movement of the airplane 10 when the scoop tube 307 is in the deployed position (reference is made to FIGS. 22-24), and/or (ii) equipped with a water scooping apparatus 500 having an inlet facing in substantially the same direction as the direction of movement of the airplane 10 when the scoop tube 307 is in the deployed position (reference is made to FIGS. 1, 2, 5-12, 19, 20, 29, and 31A-32).

Figure 4:
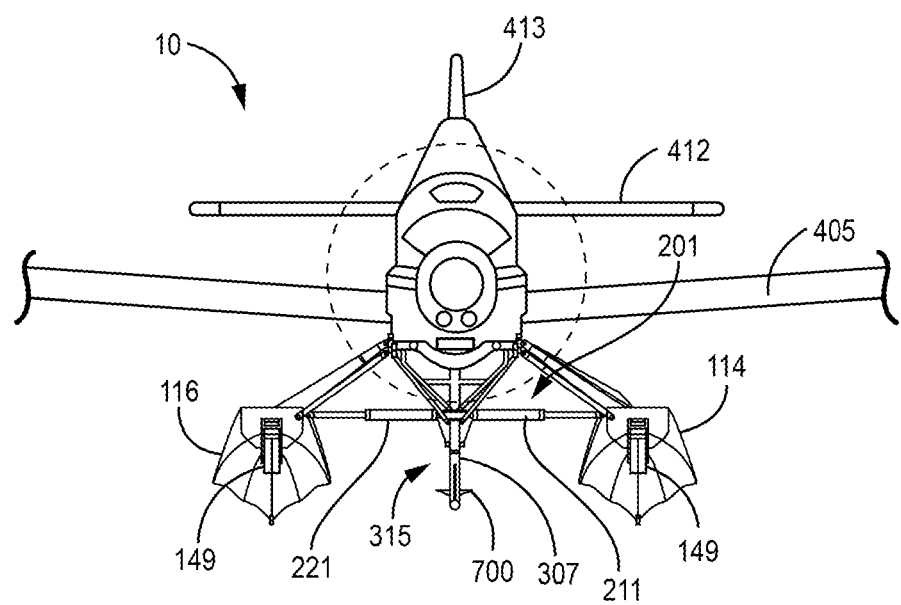
FIG. 4 is a front view of the float plane of FIG. 1, with the scoop assembly in the extended position.
Figure 5:
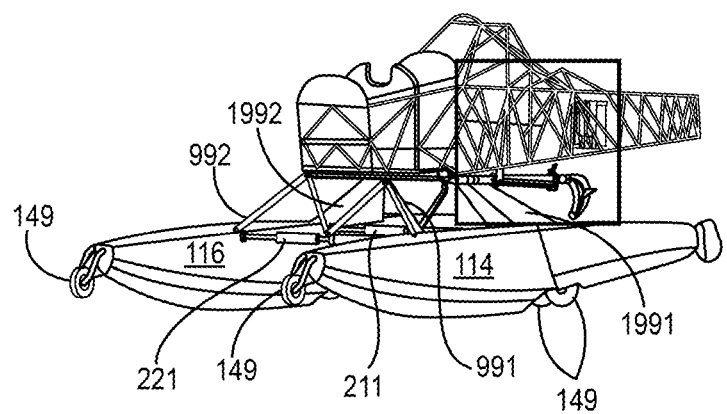
FIG. 5 is a partially broken-away perspective view of the float plane of FIG. 1, with fuselage skin omitted for illustration purposes, and showing the scoop assembly in the retracted position.
Figure 17:
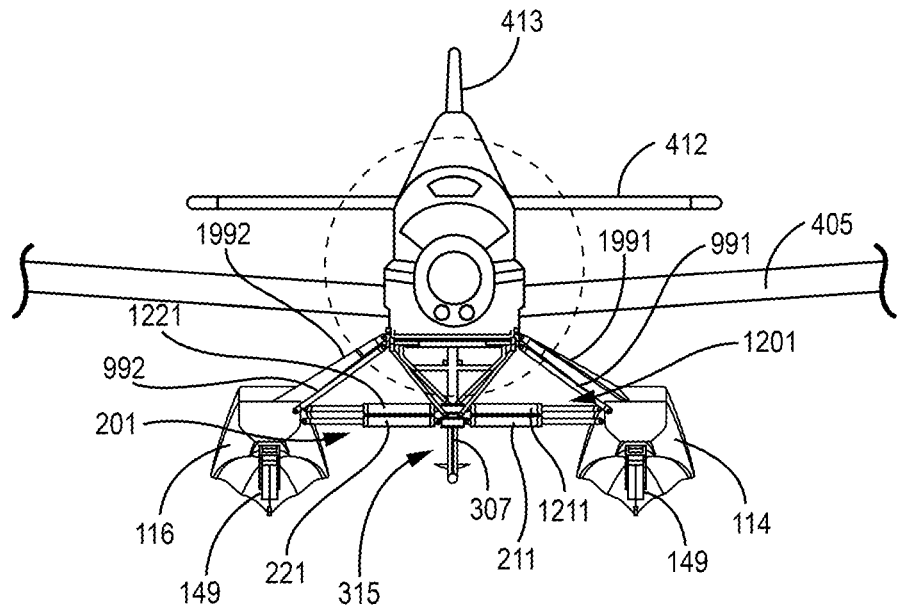
FIG. 17 is a front view of the float plane of FIG. 1, with the scoop assembly in the extended position, and with a spreader bar suspension assembly of the float plane in a default configuration.
Figure 18:
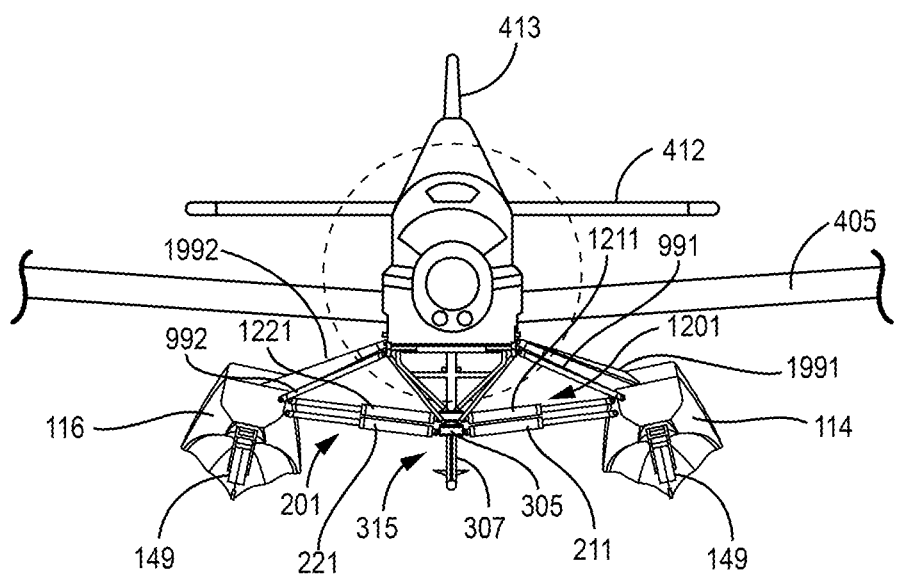
FIG. 18 is a front view of the float plane of FIG. 1, with the scoop assembly in the extended position, and with a spreader bar suspension assembly of the float plane in a deflected configuration.
Figure 19:
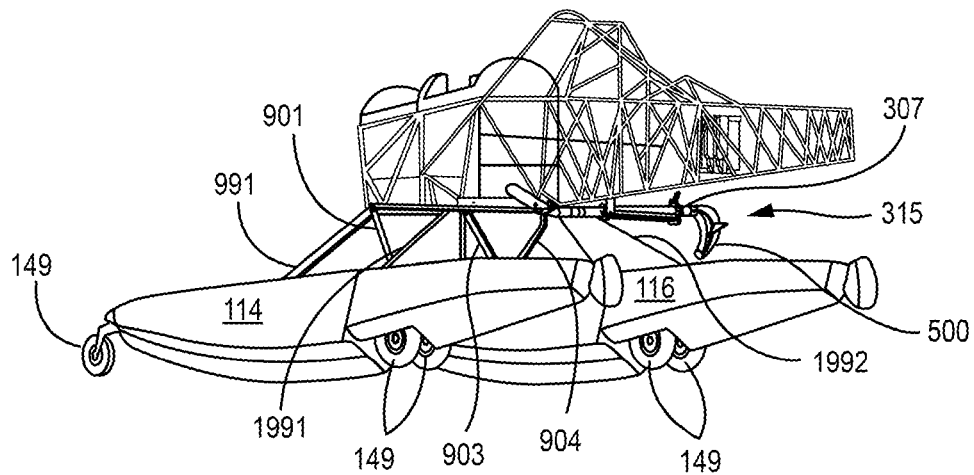
FIG. 19 is a perspective view of the float plane of FIG. 1, with the scoop assembly in the retracted position, and with a spreader bar suspension assembly of the float plane shown in a default configuration.
Figure 20:
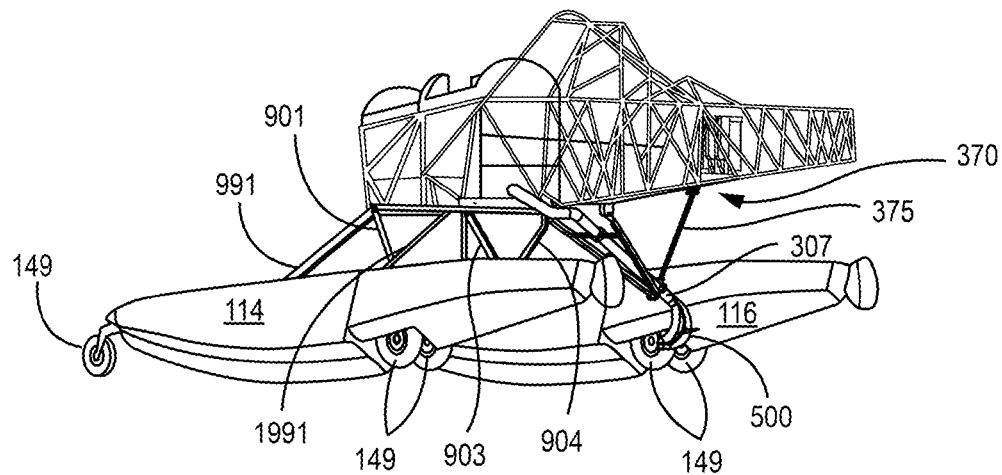
FIG. 20 is a perspective view of the float plane of FIG. 1, with the scoop assembly in the extended position, and with a spreader bar suspension assembly of the float plane shown in a default configuration.
Figure 21:
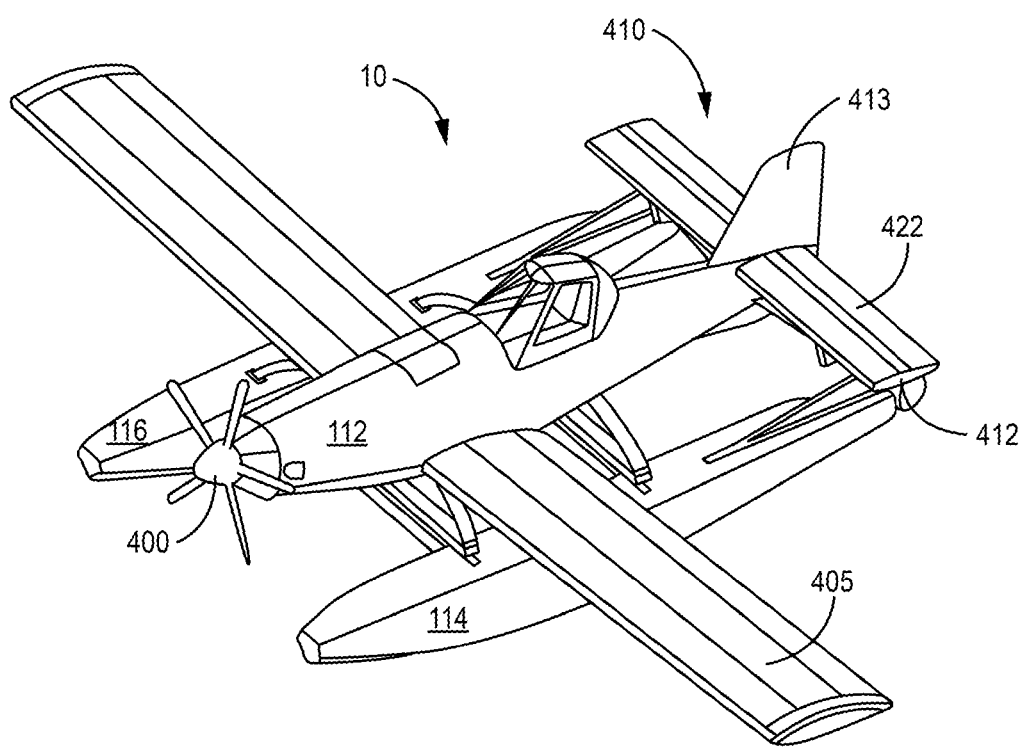
FIG. 21 is a perspective view of a float plane in accordance with other embodiments of the present disclosure.

Thus, the illustrated scoop tube 307 has a distal end 335 that is located at a scooping location when the scoop tube is in the deployed position. The scooping location is between, preferably midway between, the two floats 114, 116. This is perhaps best seen in FIGS. 4, 17, and 18. In more detail, when the illustrated scoop tube 307 is in the deployed position, its distal end 335 (and/or a water scooping apparatus 500 thereon) is at an elevation spaced a desired distance from (e.g., below) a longitudinal axis of the fuselage 112. In some cases, the floats 114, 116 are equipped with a plurality of retractable wheels 149 that, when in their extended position, are at the same, or substantially the same, elevation as noted above, and/or are spaced the same, or substantially the same, desired distance from (e.g., below) the longitudinal axis of the fuselage. It will be appreciated, of course, that when such wheels 149 are in their extended position (e.g., during a land take-off run or landing), the scoop tube 307 is in the retracted position.

As noted above, the scoop tube 307 preferably has a straight length that terminates at a distal hook portion and/or is equipped with a water scooping apparatus 500.

Figure 2:
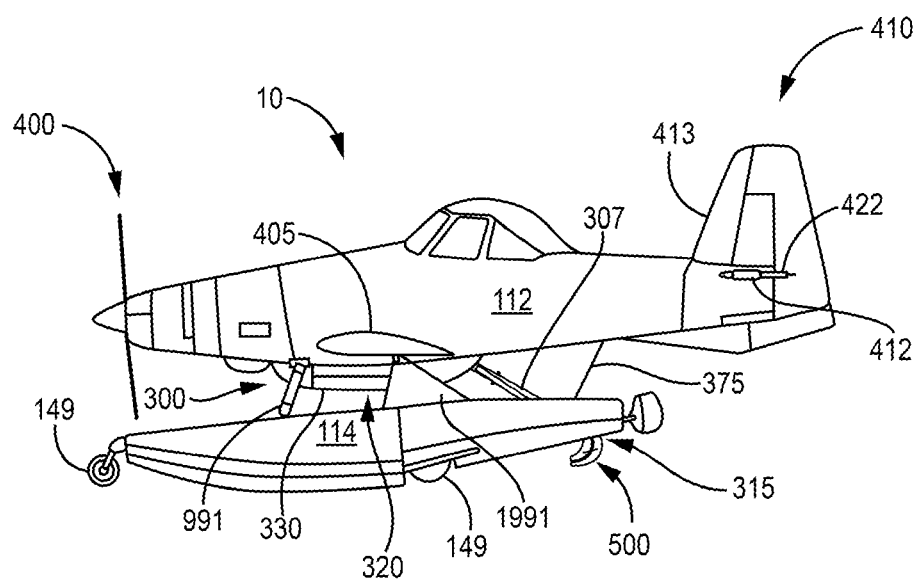
FIG. 2 is a side view of the float plane of FIG. 1, with the scoop assembly in an extended position.
Figure 3:
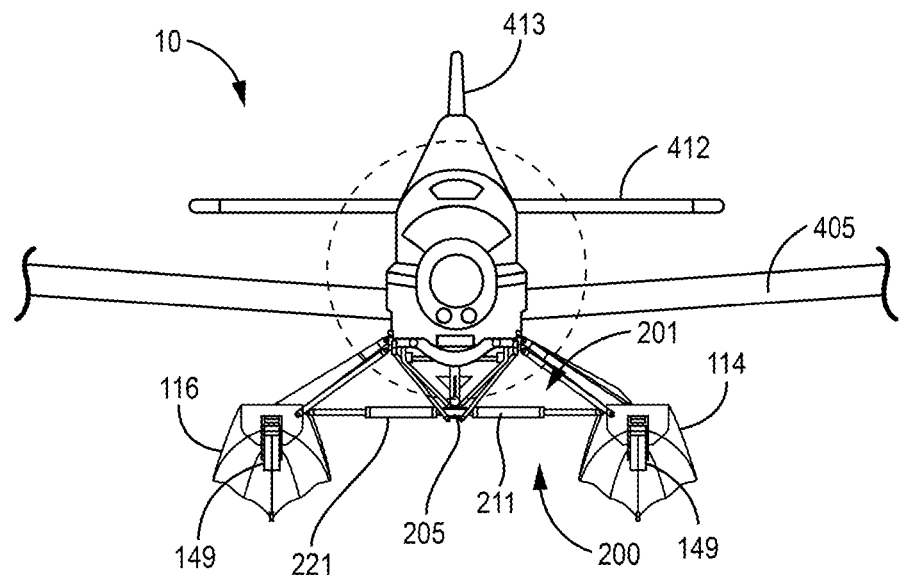
FIG. 3 is a front view of the float plane of FIG. 1, with the scoop assembly in the retracted position.
Figure 22:
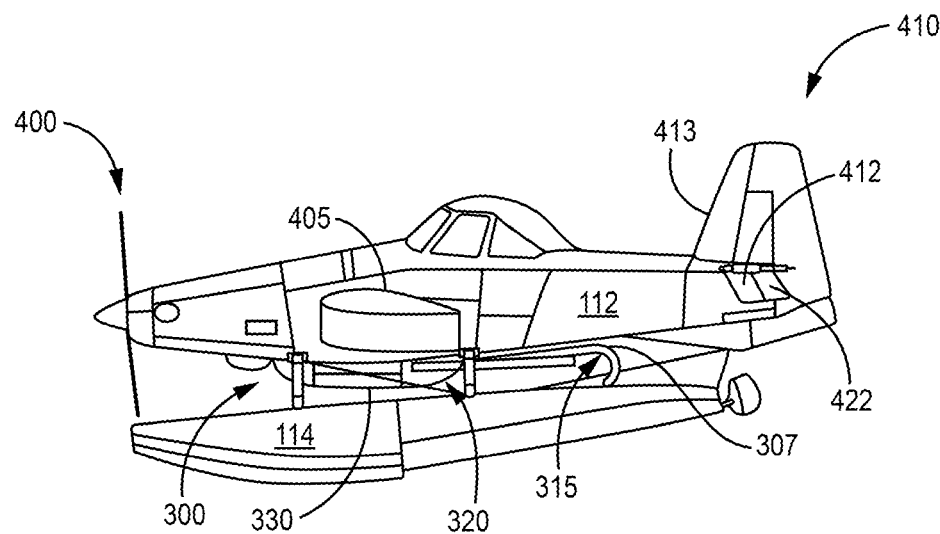
FIG. 22 is a side view of the float plane of FIG. 21, with a scoop assembly shown in a retracted position.
Figure 23:
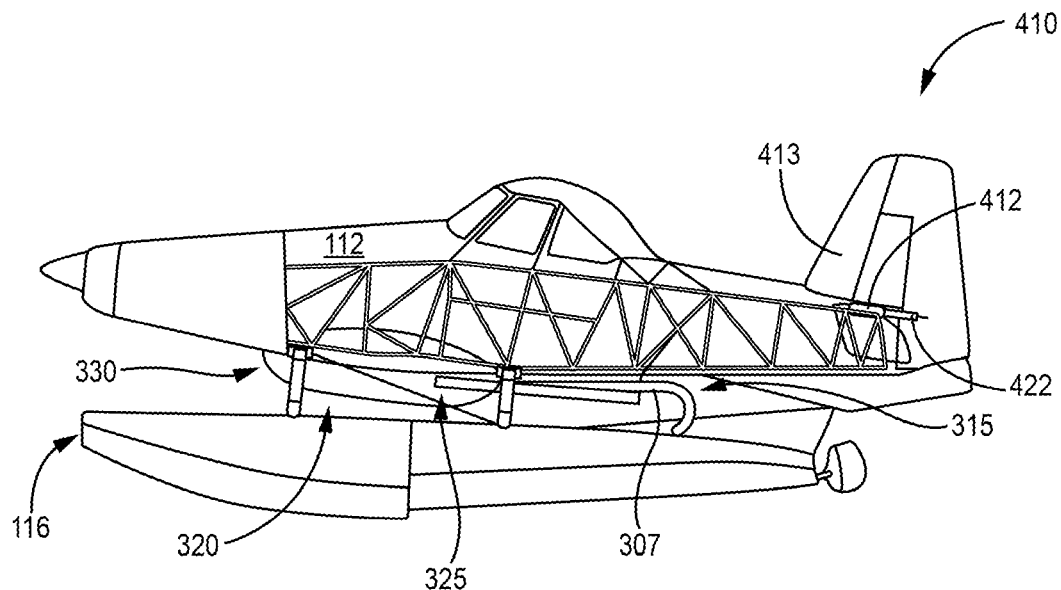
FIG. 23 is another side view of the float plane of FIG. 21, with a first float and some fuselage skin omitted for illustration purposes.
Figure 24:
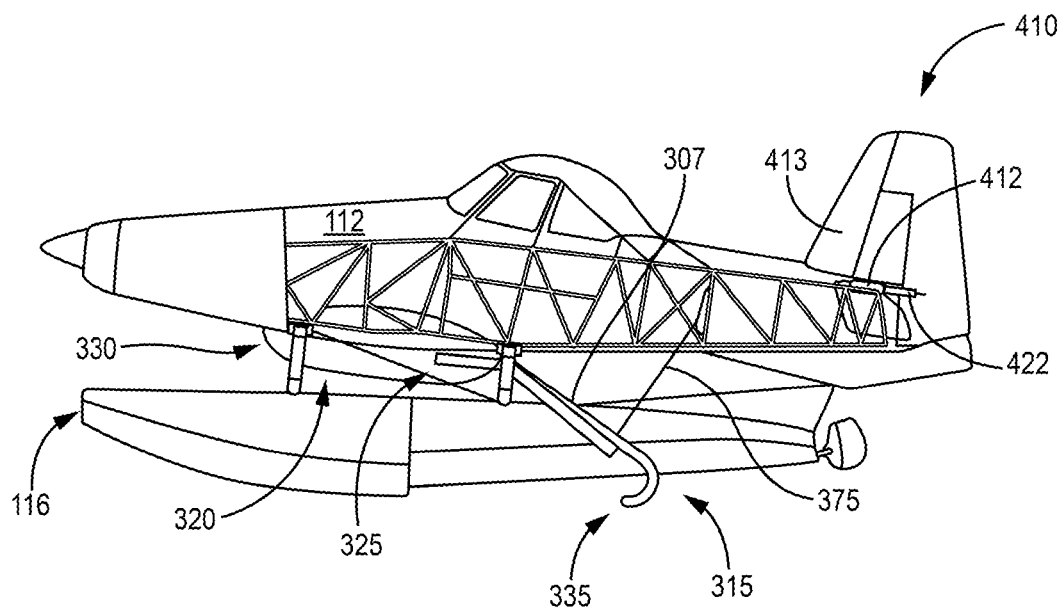
FIG. 24 is still another side view of the float plane of FIG. 21, with the scoop assembly shown in an extended position, and with a first float and some fuselage skin omitted for illustration purposes.

Preferably, the firefighting float plane includes a fire gate 320 below the water tank 300. In embodiments of this nature, the fire gate 320 may project downwardly, at least in part, below the fuselage 112. Moreover, a straight length of the scoop tube 307 can optionally be located directly behind the fire gate 320 (e.g., directly behind a fairing thereof) when the scoop tube 307 is in the stowed position. Reference is made to FIGS. 1, 22, and 23.

Thus, when the scoop tube 307 is provided, it preferably has a length that terminates at a distal hook portion and/or is equipped with a water scooping apparatus 500. When provided, the water scooping apparatus 500 itself may comprise a distal hook portion. The distal hook portion and/or water scooping apparatus 500 preferably is located outside of the fuselage 112 (and thus exposed to airflow outside the fuselage) when the scoop tube 307 is in the stowed position.

Figure 12:
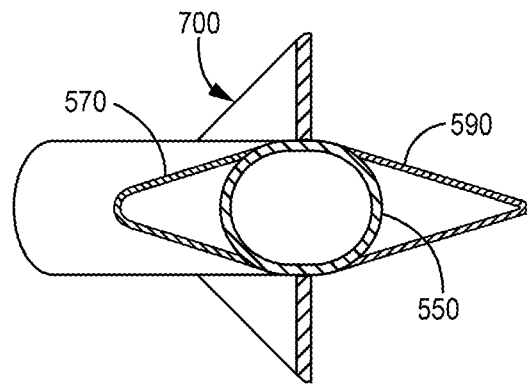
FIG. 12 is a cross-sectional view of the scooping apparatus of the scoop assembly shown in FIG. 11, with the cross-section taken along lines C-C of FIG. 11.

In some embodiments, the scoop tube 307 is equipped with a water scooping apparatus 500 configured to offset an amount of yaw instability otherwise created by the first 114 and second 116 floats. In such embodiments, the water scooping apparatus preferably comprises a leading aerodynamic wall portion 570, a tube portion 550, and a trailing aerodynamic wall portion 590. Reference is made to FIG. 12. Here, the tube portion 550 is located between the leading 570 and trailing 590 aerodynamic wall portions. The tube portion 550 is configured to receive therethrough a flow of water retrieved during a filling operation. Thus, the tube portion 550 preferably has an inlet configured to face substantially the same direction as the direction of movement of the airplane 10 when the scoop tube 307 is in the deployed position. In addition, the tube portion 550 preferably is in fluid communication with the scoop tube 307 and the water tank 300, such that water received through the inlet of the tube portion 550 flows through the tube portion 550, then through the scoop tube 307, and thereafter into the water tank 300. With the preferred leading and trailing aerodynamic wall portions 570, 590 located outside the fuselage 112 (and thus exposed to airflow outside the fuselage) when the scoop tube 307 is in the stowed position, the preferred aerodynamic wall portions 570, 590 of the water scooping apparatus 500 help to some extent in offsetting the yaw instability otherwise created by the first 114 and second 116 floats. This can optionally be in addition to providing a ventral fin, winglets on the horizontal stabilizer, and/or vertical aerodynamic surfaces on the floats.

When provided, the water scooping apparatus 500 can optionally include a hydrofoil 700. Reference is made to FIGS. 1-20.

In an exemplary filling operation, the airplane 10 travels across a surface of a body of water (e.g., with the floats skimming the surface) at a speed of about 60-80 miles per hour for about 15 seconds, while the scooping assembly 315 is in the extended configuration so as to deliver about 820 gallons of water into the airplane's water tank 300. The engine thrust may be about 2,500 pounds. It is to be appreciated, however, that the parameters of a given filling operation can be varied within suitable ranges, e.g., based on the particular design of the airplane, the operating conditions, and pilot preference.

The scoop assembly 315 preferably is attached to a mounting structure 800. In some embodiments, the scoop assembly 315 is attached to a mounting structure 800 at an attachment location that is spaced below the fuselage 112. Reference is made to FIGS. 21-27. Here, the firefighting float plane includes a front float-attach framework and a rear float-attach framework. The front and rear float-attach frameworks connect the first 114 and second 116 floats to the fuselage 112. The scoop assembly 315 seen in FIGS. 22-25 is mounted to the rear float-attach framework. This is perhaps best shown in FIG. 25. In some cases, the wing 405 is located longitudinally between (or at least substantially between) the front and rear float-attach frameworks. Reference is made to FIG. 22. These details, however, are by no means required.

In the illustrated embodiments, when the elongated scoop tube 307 is in the stowed configuration, a distal end of the elongated scoop tube does not project as far aft as does the fuselage 112.

In some embodiments, the first 114 and second 116 floats have rear ends, and when the elongated scoop tube 307 is in the stowed configuration, the distal end of the elongated scoop tube projects further aft than do the rear ends of the first and second floats. Reference is made to FIG. 1. It is to be appreciated, however, that this is by no means required. For example, the afterbody of each float may have a greater length in various embodiments, the floats may be mounted further aft on the fuselage, or the scoop assembly may have a shorter length. Reference is made to FIGS. 22 and 23.

Spreader Bar Suspension Assembly

In some embodiments, the airplane 10 has a spreader bar suspension assembly 200. The spreader bar suspension assembly 200 is configured to absorb impact energy during takeoff and landing. In these embodiments, the airplane 10 need not be a firefighting float plane. To the contrary, the spreader bar suspension assembly 200 can be provided advantageously on a float plane having no water scoop(s) and no water tank. The spreader bar suspension assembly 200, however, is quite advantageous for firefighting float planes given the challenging conditions and maneuvers they sometimes encounter and perform. Thus, in certain embodiments, the present airplane 10 is a firefighting float plane that has a water tank 300 and water scoop(s) in addition to having the spreader bar suspension assembly 200. Moreover, the spreader bar suspension assembly 200 affords particular advantages, and involves particular configurations/features, when provided on an airplane 10 together with a water scoop assembly 315 of the nature described above. In other embodiments wherein the spreader bar suspension assembly 200 is provided, the firefighting float plane has conventional water scoops on the bottoms of the floats.

The spreader bar suspension assembly 200 comprises a first spreader bar bridge 201 extending crosswise between the first 114 and second floats 116. The first spreader bar bridge 201 preferably is connected to both the first 114 and second floats 116 (e.g., at interior sides of the floats). The first spreader bar bridge 201 comprises a first shock absorber 211. The illustrated first shock absorber 211 is closer to the first float 114 than to the second float 116. In other cases, the first spreader bar bridge has only a single shock absorber, i.e., the first shock absorber, and it is centered midway between the first and second floats.

Preferably, the first shock absorber 211 is elongated (e.g., has its length/major dimension extending) along an axis that passes through both the first 114 and second 116 floats. In some cases, the first shock absorber 211 has a cylindrical configuration centered on this axis. This can be appreciated with reference to FIGS. 3, 4, 13, and 14, as well as FIGS. 15-18.

The illustrated first spreader bar bridge 201 includes both the first shock absorber 211 and a second shock absorber 221. When provided, the first 211 and second 221 shock absorbers preferably are spaced apart from each other, such that the first shock absorber 211 is closer to the first float 114 than to the second float 116, while the second shock absorber 221 is closer to the second float 116 than to the first float 114. One advantageous configuration for the first spreader bar bridge 201 involves an arrangement wherein a central region 205 (e.g., a central link bar) of the first spreader bar bridge 201 is located between (and optionally connected to both) the first 211 and second 221 shock absorbers. This is perhaps best shown in FIG. 14.

Preferably, each of the illustrated first and second shock absorbers 211, 221 is elongated along (and optionally has a cylindrical configuration centered on) an axis that passes through both the first 114 and second 116 floats. In the position shown in FIG. 14, both the first and second shock absorbers 211, 221 are elongated along (and each has a cylindrical configuration centered on) the same axis, which passes through both the first 114 and second 116 floats. In more detail, in the position shown in FIG. 14, both the first and second shock absorbers 211, 221 preferably are coaxial.

Figure 14:
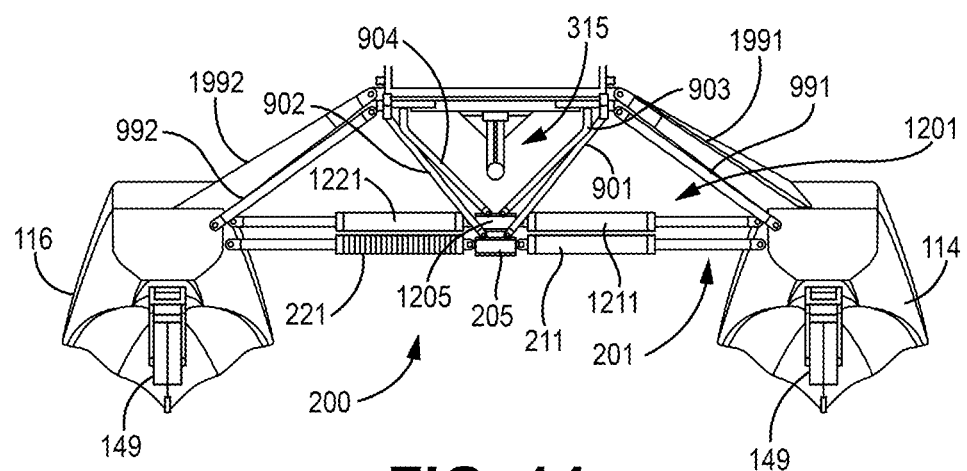
FIG. 14 is a detail view of the spreader bar suspension assembly in an area delineated by the dashed-line rectangle of FIG. 13.

The illustrated spreader bar suspension assembly 200 further comprises a first strut frame connecting the fuselage 112 to the first spreader bar bridge 201. The first strut frame comprises first 901 and second 902 central struts extending away from the fuselage 112 and toward the first spreader bar bridge 201 in a converging manner. Preferably, the first 901 and second 902 central struts are connected to the central region 205 (e.g., a central link bar) of the first spreader bar bridge 201. With reference to FIG. 14, it can be appreciated that the illustrated first strut frame (e.g., first 901 and second 902 central struts thereof) delineate(s) a generally triangular shape, with a corner of the generally triangular shape located at the central region (e.g., a central link bar) of the first spreader bar bridge 201. It is to be appreciated, however, that the specific configuration of struts provided in the spreader bar suspension assembly 200 can be varied.

In FIGS. 1-20, the first shock absorber 211 is closer to the first central strut 901 (and/or closer to a central region 205 of the first spreader bar bridge 201) than to the first float 114, and the second shock absorber 221 is closer to the second central strut 902 (and/or closer to a central region 205 of the first spreader bar bridge 201) than to the second float 116. This is perhaps best shown in FIGS. 14 and 16. In other cases, first and second shock absorbers may be positioned closer to the floats.

The illustrated spreader bar suspension assembly 200 further comprises first 991 and second 992 outside strut bars (or "float struts"). The first outside strut bar 991 extends between the fuselage 112 and the first float 114, whereas the second outside strut bar 992 extends between the fuselage 112 and the second float 116.

The first outside strut bar 991 is adjacent to both the first central strut 901 and a first crosswise section of the first spreader bar bridge 201. The first crosswise section of the first spreader bar bridge 201 includes the first shock absorber 211. The first crosswise section of the first spreader bar bridge 201 preferably also includes a crosswise strut segment extending from the first shock absorber 211 to the first float 114. The first shock absorber 211 is extendable resiliently, such that the first crosswise section of the first spreader bar bridge 201 has a length that is extendable. The first outside strut bar 991 and the first crosswise section of the first spreader bar bridge 201 are both attached to the first float 114, such that when the length of the first crosswise section of the first spreader bar bridge is extended (e.g., in response to forces experienced during landing or take-off), the first float 114 moves between a default position and a deflected position. More will be said of this later.

Similarly, the second outside strut bar 992 is adjacent to both the second central strut 902 and a second crosswise section of the first spreader bar bridge 201. The second crosswise section of the first spreader bar bridge 201 includes the second shock absorber 221. The second crosswise section of the first spreader bar bridge 201 preferably also includes a crosswise strut segment extending from the second shock absorber 221 to the second float 116. The second shock absorber 221 is extendable resiliently, such that the second crosswise section of the first spreader bar bridge 201 has a length that is extendable. The second outside strut bar 992 and the second crosswise section of the first spreader bar bridge 201 are both attached to the second float 116, such that when the length of the second crosswise section of the first spreader bar bridge 201 is extended (e.g., in response to forces experienced during landing or take-off), the second float 116 moves between a default position and a deflected position.

Preferably, the spreader bar suspension assembly 200 further includes a second spreader bar bridge 1201 extending crosswise between the first 114 and second 116 floats. The second spreader bar bridge 1201 preferably is connected to both the first 114 and second 116 floats (e.g., at interior sides thereof). The second spreader bar bridge 1201 is closer to the tail 410 of the float plane than to the nose of the float plane, whereas the first spreader bar bridge 201 is closer to the nose of the float plane than to the tail 410 of the float plane. If desired, the spreader bar suspension assembly may further include a third spreader bar bridge, or just a conventional spreader bar, in addition to the first and second spreader bar bridges. Moreover, flying wires, boxing wires, and/or various other struts can be provided, if so desired.

The second spreader bar bridge 1201 comprises a first rear shock absorber 1211. The illustrated first rear shock absorber 1211 is closer to the first float 114 than to the second float 116. In other cases, the second spreader bar bridge has a single shock absorber centered midway between the first and second floats.

Preferably, the first rear shock absorber 1211 is elongated along an axis that passes through both the first 114 and second 116 floats. In some cases, the first rear shock absorber 1211 has a cylindrical configuration centered on this axis.

When provided, the second spreader bar bridge 1201 preferably comprises both the first rear shock absorber 1211 and a second rear shock absorber 1221. The illustrated first 1211 and second 1221 rear shock absorbers are spaced apart from each other, such that the first rear shock absorber 1211 is closer to the first float 114 than to the second float 116, while the second rear shock absorber 1221 is closer to the second float 116 than to the first float 114. One advantageous configuration for the second spreader bar bridge 1201 involves an arrangement wherein a central region 1205 (e.g., a central link bar) of the second spreader bar bridge 1201 is located between (and optionally connected to both) the first 1211 and second 1221 rear shock absorbers. This is perhaps best shown in FIG. 14.

In the illustrated embodiment, the spreader bar suspension assembly 200 further includes a second strut frame connecting the fuselage 112 to the second spreader bar bridge 1201. The illustrated second strut frame comprises third 903 and fourth 904 central struts extending away from the fuselage 112 and toward the second spreader bar bridge 1201 in a converging manner. The third 903 and fourth 904 central struts are connected to a central region 1205 (e.g., a central link bar) of the second spreader bar bridge 1201. The central region 1205 of the second spreader bar bridge 1201 is located between the first 1211 and second 1221 rear shock absorbers.

Referring again to FIG. 14, it can be appreciated that the illustrated second strut frame (e.g., the third 903 and fourth 904 central struts thereof) delineate(s) a generally triangular shape, with a corner of the generally triangular shape located at the central region 1205 (e.g., a central link bar) of the second spreader bar bridge 1201. As noted above, however, the specific configuration of struts in the spreader bar suspension assembly 200 can be varied.

In the embodiment illustrated, the first rear shock absorber 1211 is closer to the third central strut 903 (and/or closer to a central region 1205 of the second spreader bar bridge 1201) than to the first float 114, and the second rear shock absorber 1221 is closer to the fourth central strut 904 (and/or closer to a central region 1205 of the second spreader bar bridge 1201) than to the second float 116. In other cases, first and second rear shock absorbers are positioned closer to the floats.

The illustrated spreader bar suspension assembly 200 further comprises third 1991 and fourth 1992 outside strut bars (or "float struts"). In FIGS. 1-20, the third 1991 and fourth 1992 outside strut bars are parts of pylon assemblies. The illustrated pylons are aligned longitudinally with (i.e., are at the same locations along the longitudinal length of the floats as) the main wheels 149. This is perhaps best seen in FIGS. 1, 2, 19, 20, 28, 30, and 32. This, however, is not required. For example, strut bars without pylons may be used instead. Furthermore, the front struts can optionally be provided with pylons, if so desired.

The third outside strut bar 1991 extends between the fuselage 112 and the first float 114. The fourth outside strut bar 1992 extends between the fuselage 112 and the second float 116.

The third outside strut bar 1991 is adjacent to both the third central strut 903 and a first crosswise section of the second spreader bar bridge 1201. The first crosswise section of the second spreader bar bridge 1201 includes the first rear shock absorber 1211. The first crosswise section of the second spreader bar bridge 1201 preferably also includes a crosswise strut segment extending from the first rear shock absorber 1211 to the first float 114. The first rear shock absorber 1211 is extendable resiliently, such that the first crosswise section of the second spreader bar bridge 1201 has a length that is extendable. The third outside strut bar 1991 and the first crosswise section of the second spreader bar bridge 1201 are attached to the first float 114, such that when the length of the first crosswise section of the second spreader bar bridge 1201 is extended (e.g., in response to forces experienced during landing or take-off), the first float 114 moves between a default position and a deflected position.

Similarly, the fourth outside strut bar 1992 is adjacent to both the fourth central strut 904 and a second crosswise section of the second spreader bar bridge 1201. The second crosswise section of the second spreader bar bridge 1201 includes the fourth shock absorber 1221. The fourth shock absorber 1221 is extendable resiliently, such that the second crosswise section of the second spreader bar bridge 1201 has a length that is extendable. The fourth outside strut bar 1992 and the second crosswise section of the second spreader bar bridge 1201 are attached to the second float 116, such that when the length of the second crosswise section of the second spreader bar bridge 1201 is extended (e.g., in response to forces experienced during landing or take-off), the second float 116 moves between a default position and a deflected position.

Thus, with the illustrated spreader bar suspension assembly 200, the first and second floats 114, 116 are configured to move between a default (or "relaxed") position and a deflected (or "stressed") position. When the floats 114, 116 are in the default position, they are closer together than when they are in the deflected position. In addition, the outside strut bars 991, 992, 1991, 1992, the first and second crosswise sections of the first spreader bar bridge 201, the first and second crosswise sections of the second spreader bar bridge 1201, and the floats 114, 116 are each oriented at different angles when the floats 114, 116 are in the default position compared to when the floats are in the deflected position. For example, the first 114 and second 116 floats when in the deflected position are angled outwardly to a certain extent (such that if they have keels, their keels point away from each other to some degree) under the force of takeoff and landing. In contrast, when the floats 114, 116 are in the default position, vertical centerlines of the first 114 and second 116 floats preferably are parallel to each other.

Figure 15:
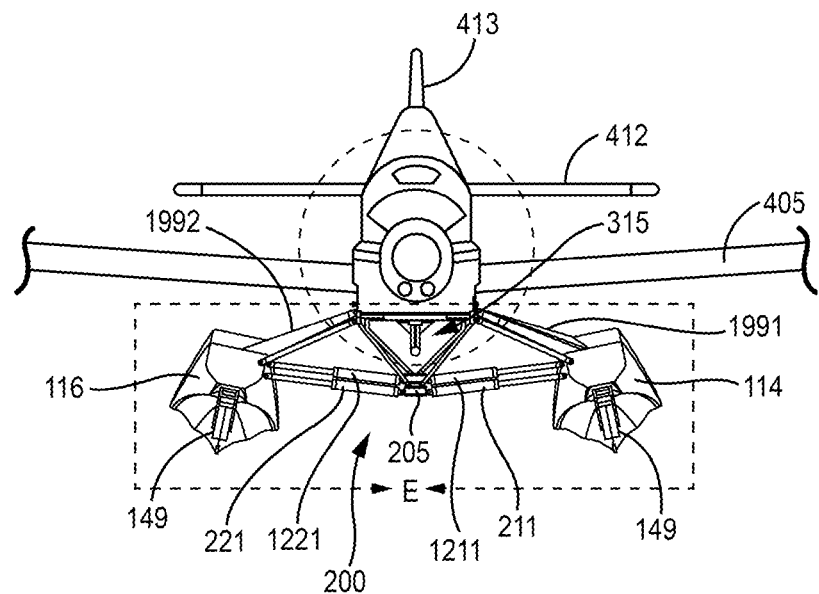
FIG. 15 is a front view of the float plane of FIG. 1, with the scoop assembly in the retracted position, and with a spreader bar suspension assembly of the float plane in a deflected configuration.
Figure 16:
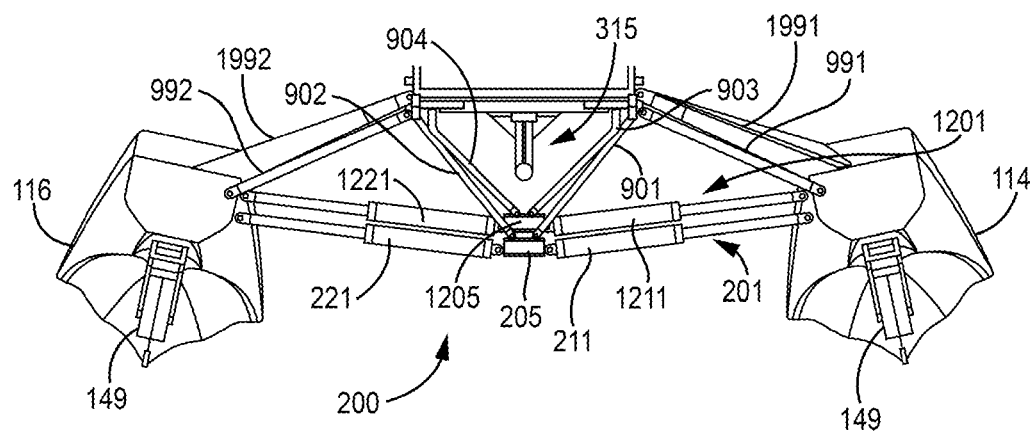
FIG. 16 is a detail view of the spreader bar suspension assembly in an area delineated by the dashed-line rectangle of FIG. 15.

FIGS. 13, 14, 17, and 18 show the floats 114, 116 in the default position. FIGS. 15 and 16 show the floats 114, 116 in a deflected position. In more detail, FIGS. 15 and 16 show each of the floats 114, 116 with 12 inches of deflection from the default position. It will be appreciated that the amount of deflection (e.g., during a landing or takeoff) will vary based on the forces experienced.

With respect to the one or more shock absorbers that are part of the spreader bar suspension assembly, various types can be used. For example, each shock absorber may comprise a plurality of alternating resilient members and rigid (e.g., metal) members, such as alternating rubber members and aluminum (or another aircraft metal) members. Reference is made to FIG. 14, which shows the second shock absorber 221 in a broken-way, schematic view wherein a series of rubber discs and aluminum discs are provided. Shock absorbers can be provided, for example, in accordance with U.S. Pat. No. 1,533,844 (Folland et al.) or U.S. Pat. No. 3,039,757 (Barr). Another possibility is to use shock absorbers that employ compressed air, oil, or both. More generally, any shock absorber construction suitable for float plane use can be provided.

When no take-off force, landing force, or other extreme force is applied to the spreader bar suspension assembly 200, it is in the default position (see FIGS. 13, 14, 17, and 18). When a take-off force, landing force, or other extreme force is applied to the spreader bar suspension assembly 200, it is extended resiliently (i.e., "deflects"), thereby moving to a deflected position (see FIGS. 15 and 16).

The struts of the spreader bar suspension assembly can be attached to the fuselage either directly or indirectly. In some embodiments, a mount frame is provided that mounts one or more (optionally all) of the struts to the fuselage. When provided, the mount frame can be anchored to the bottom region of the fuselage by any conventional means, including various mechanical fasteners. Thus, when the present disclosure describes a strut or another member as being connected to the fuselage, the connection may be either direct or indirect (e.g., via an optional mount frame).

Preferably, both ends of each spreader bar bridge 201, 1201 are attached respectively to the first 114 and second 116 floats by pivot joints. In addition, both ends of each outside strut bar 991, 992, 1991, 1992 preferably are attached respectively to the fuselage 112 and one of the floats 114, 116 by pivot joints. This type of pivot joint connection can be used advantageously to enable the floats and the spreader bar suspension assembly to move between the above-noted default and deflected positions.

The outside strut bars 991, 992, 1991, 1992 of the spreader bar suspension assembly 200 preferably are connected to the floats 114, 116 at top sides of the floats. Moreover, the ends of the spreader bar bridges 201, 1201 preferably are attached the first 114 and second 116 floats at interior sides of the floats.

Figure 32:
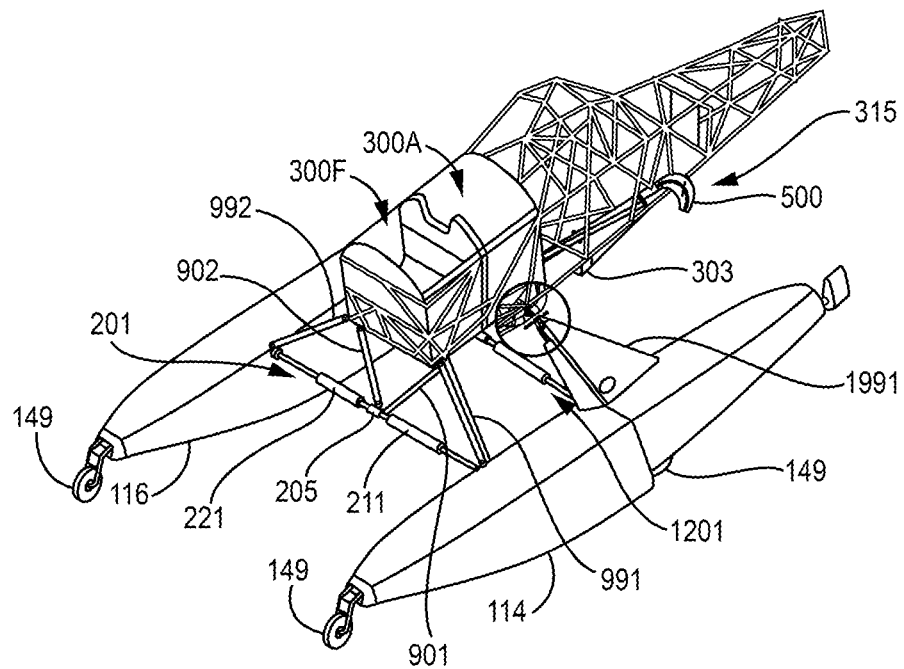
FIG. 32 is a partially broken-away schematic perspective view of a float plane having a pylon ball joint assembly in accordance with certain embodiments of the present disclosure.
Figure 33:
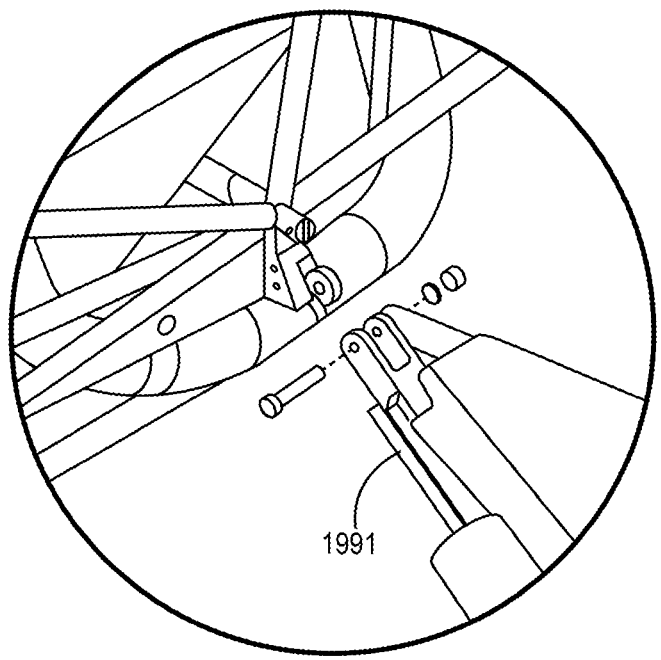
FIG. 33 is an exploded detail view of the pylon ball joint assembly shown in FIG. 32 in an area delineated by the dashed-line circle G of FIG. 32.

Referring now to FIGS. 32 and 33, the spreader bar suspension assembly 200 can optionally include a plurality of ball joint assemblies. To address the possibility of the float system reacting unsymmetrically (e.g., between front and rear shock absorbers), the upper ends of two outside strut bars (or "float struts") 1991, 1992 preferably are each connected to the fuselage 112 via a "ball joint" type connection. This arrangement can be provided to negate binding of the system that would be caused by the "out of plane" movement of either float.

Figure 13:
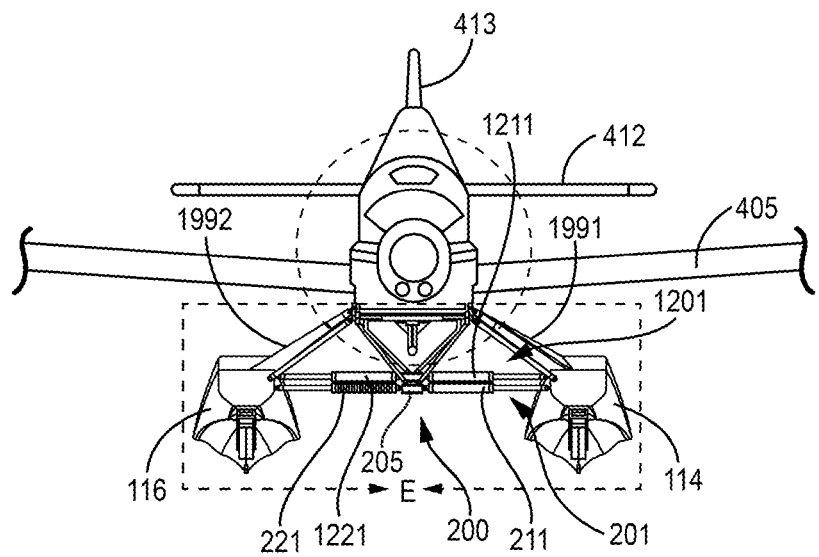
FIG. 13 is a front view of the float plane of FIG. 1, with the scoop assembly in the retracted position, and with a spreader bar suspension assembly of the float plane in a default configuration.

In embodiments where the airplane 10 includes both a spreader bar suspension assembly 200 and a scoop assembly 315, a first spreader bar bridge 201 extends crosswise between, so as to be connected to both, the first 114 and second 116 floats. As noted above, the scoop assembly 315 preferably includes an elongated scoop tube 307 with a distal hook portion (which may either be part of the scoop tube itself or part of a water scooping apparatus with which the scoop tube is equipped). Preferably, the distal hook portion (its entirety or at least a portion thereof) is: (i) located above the first spreader bar bridge 201 when the elongated scoop tube 307 is in the stowed configuration (reference is made to FIGS. 13-16), and (ii) is located below the first spreader bar bridge 201 when the elongated scoop tube 307 is in the deployed configuration (reference is made to FIGS. 17-18). In such embodiments, when the elongated scoop tube 307 is in the stowed configuration, the distal hook portion (its entirety or at least a portion thereof) is located closer the fuselage 112 than is the first spreader bar bridge 201, and when the elongated scoop tube 307 is in the deployed configuration, the distal hook portion (its entirety or at least a portion thereof) is located further from the fuselage 112 than is the first spreader bar bridge 201. In such cases, when the elongated scoop tube 307 is in the stowed configuration, the distal hook portion (its entirety or at least a portion thereof) is located between the fuselage 114 and the first spreader bar bridge 201. This is shown in FIGS. 13 and 15.

Thus, various embodiments of the airplane 10 are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A firefighting float plane comprising a fuselage, a wing, a water tank, first and second floats, and a scoop assembly, the water tank including a fore compartment and an aft compartment, the scoop assembly comprising a scoop tube, at least part of the scoop tube being external to the fuselage, the scoop tube being part of a flow line that enters the fuselage and branches into first and second flow lines, the first flow line extending into the aft compartment and having a discharge outlet located in the aft compartment, the second flow line passing through the aft compartment and extending into the fore compartment and having a discharge outlet located in the fore compartment.

2. The firefighting float plane of claim 1 wherein the flow line that the scoop tube is part of enters the fuselage through a bottom wall of the fuselage.

3. The firefighting float plane of claim 1 wherein the firefighting float plane includes a fire gate, the fire gate comprising a water compartment configured to retain a volume of water below the fuselage, the water compartment of the fire gate being in fluid communication with both the fore and aft compartments of the water tank.

4. The firefighting float plane of claim 1 wherein the scoop tube is located outside of the fuselage, whereas the first and second flow lines are located inside the fuselage.

5. The firefighting float plane of claim 1 wherein the flow line that branches into first and second flow lines is a single flow line having a Y connection where it branches into the first and second flow lines, and the Y connection is located inside the fuselage.

6. The firefighting float plane of claim 1 wherein the scoop tube is a single scoop tube aligned with a centerline of the fuselage.

7. The firefighting float plane of claim 1 wherein the scoop assembly is configured such that a flow path along which water scooped from a body of water travels before reaching the water tank is devoid of lateral turns.

8. The firefighting float plane of claim 1 wherein the scoop tube is part of a plumbing configuration for the scoop assembly that includes a deceleration region configured to slow water flow before it enters the water tank.

9. The firefighting float plane of claim 8 wherein the deceleration region comprises a tube section having an inner diameter that increase in a direction of flow toward the water tank.

10. The firefighting float plane of claim 1 wherein the firefighting float plane is an amphibious aircraft configured to takeoff from, and land on, both land and water, such that the first and second floats are equipped with retractable wheels.

11. The firefighting float plane of claim 1 wherein the water tank has a capacity in a range of 600 to 1,150 gallons.

12. The firefighting float plane of claim 1 wherein the firefighting float plane has an engine power in a range of between 1,400 and 2,500 horsepower.

13. A firefighting float plane comprising a fuselage, a wing, a water tank, first and second floats, and a scoop assembly, the water tank including a fore compartment and an aft compartment, the scoop assembly comprising a scoop tube, at least part of the scoop tube being external to the fuselage, the scoop tube being part of a flow line that enters the fuselage and branches into first and second flow lines, the first flow line extending into the aft compartment and having a discharge outlet located in the aft compartment, the second flow line passing through the aft compartment and extending into the fore compartment and having a discharge outlet located in the fore compartment, and wherein the first and second flow lines extend through openings in a rear side of the aft compartment of the water tank.

14. The firefighting float plane of claim 13 wherein the second flow line extends through an opening in a rear side of the fore compartment of the water tank.

15. The firefighting float plane of claim 14 wherein the second flow line passes through a wing spar passage located between the fore and aft compartments of the water tank.

16. A firefighting float plane comprising a fuselage, a wing, a water tank, first and second floats, and a scoop assembly, the water tank including a fore compartment and an aft compartment, the scoop assembly comprising a scoop tube, at least part of the scoop tube being external to the fuselage, the scoop tube being part of a flow line that enters the fuselage and branches into first and second flow lines, the first flow line extending into the aft compartment and having a discharge outlet located in the aft compartment, the second flow line passing through the aft compartment and extending into the fore compartment and having a discharge outlet located in the fore compartment, wherein the flow line is part of a flow path along which water scooped from a body of water travels before reaching the water tank, and wherein the flow path does not turn so much that any portion of the flow path is located between lateral sidewalls of the water tank and an adjacent skin of the fuselage.

* * * * *